US012639724B2

(12) United States Patent (10) Patent No.: US 12,639,724 B2
Solow et al. (45) Date of Patent: May 26, 2026

(54) PREDICTIVE ARTIFICIAL INTELLIGENCE MODEL GENERATION AND EXECUTION

(71) Applicant: Bank of America Corporation, Charlotte, NC (US)

(72) Inventors: Aeric Solow, Richardson, TX (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 90 days.

(21) Appl. No.: 18/234,493

(22) Filed: Aug. 16, 2023

(65) Prior Publication Data

US 2025/0061471 A1 Feb. 20, 2025

(51) Int. Cl.
| *G06Q 30/0201* | (2023.01) |
| *G06Q 30/0251* | (2023.01) |
| *H04L 41/16* | (2022.01) |

(52) U.S. Cl.
CPC ..... *G06Q 30/0201* (2013.01); *G06Q 30/0269* (2013.01); *H04L 41/16* (2013.01)

(58) Field of Classification Search
CPC ............................ G06Q 30/0201; H04L 41/16
See application file for complete search history.

(56) References Cited

U.S. PATENT DOCUMENTS

| 7,624,079 | B2 | 11/2009 | Hartman et al. |
| 10,416,619 | B2 | 9/2019 | Piche |

| 10,755,188 | B2 | 8/2020 | Ashrafi | |
| 11,100,560 | B2 | 8/2021 | Parker et al. | |
| 11,853,401 | B1 * | 12/2023 | Nookula | G06F 18/2163 |
| 2018/0357552 | A1 | 12/2018 | Campos et al. | |
| 2021/0342745 | A1 | 11/2021 | Zeiler et al. | |
| 2023/0215523 | A1 * | 7/2023 | Sukhtipyaroge | G16H 50/70 705/3 |
| 2023/0359944 | A1 * | 11/2023 | Sheehan | G06Q 30/0201 |
| 2024/0127159 | A1 * | 4/2024 | Chellappa | G06Q 10/067 |
| 2024/0311680 | A1 * | 9/2024 | Poumellec | G06N 20/00 |
| 2024/0370949 | A1 * | 11/2024 | Fritz | G06N 20/10 |
| 2024/0403103 | A1 * | 12/2024 | Frick | G06F 9/45558 |

* cited by examiner

*Primary Examiner* — Caroline H Jahnige
(74) *Attorney, Agent, or Firm* — Banner & Witcoff, Ltd.

(57) ABSTRACT

A predictive AI model generation and execution system with a plurality of engines is provided. A data exchange computing engine may receive and process one or more data streams to generate processed data, and send the processed data to a model generation and execution computing engine. The model generation and execution computing engine may receive the processed data and update a first predictive artificial intelligence model using the processed data. The client interface computing engine may receive a model execution request, generate and send a first graphical user interface, receive model execution data from the external client computing system, and send the model execution data to the workflow management computing engine. The workflow management computing engine may generate one or more model execution instructions based on the model execution data, and send the one or more model execution instructions to the model generation and execution computing engine.

18 Claims, 17 Drawing Sheets

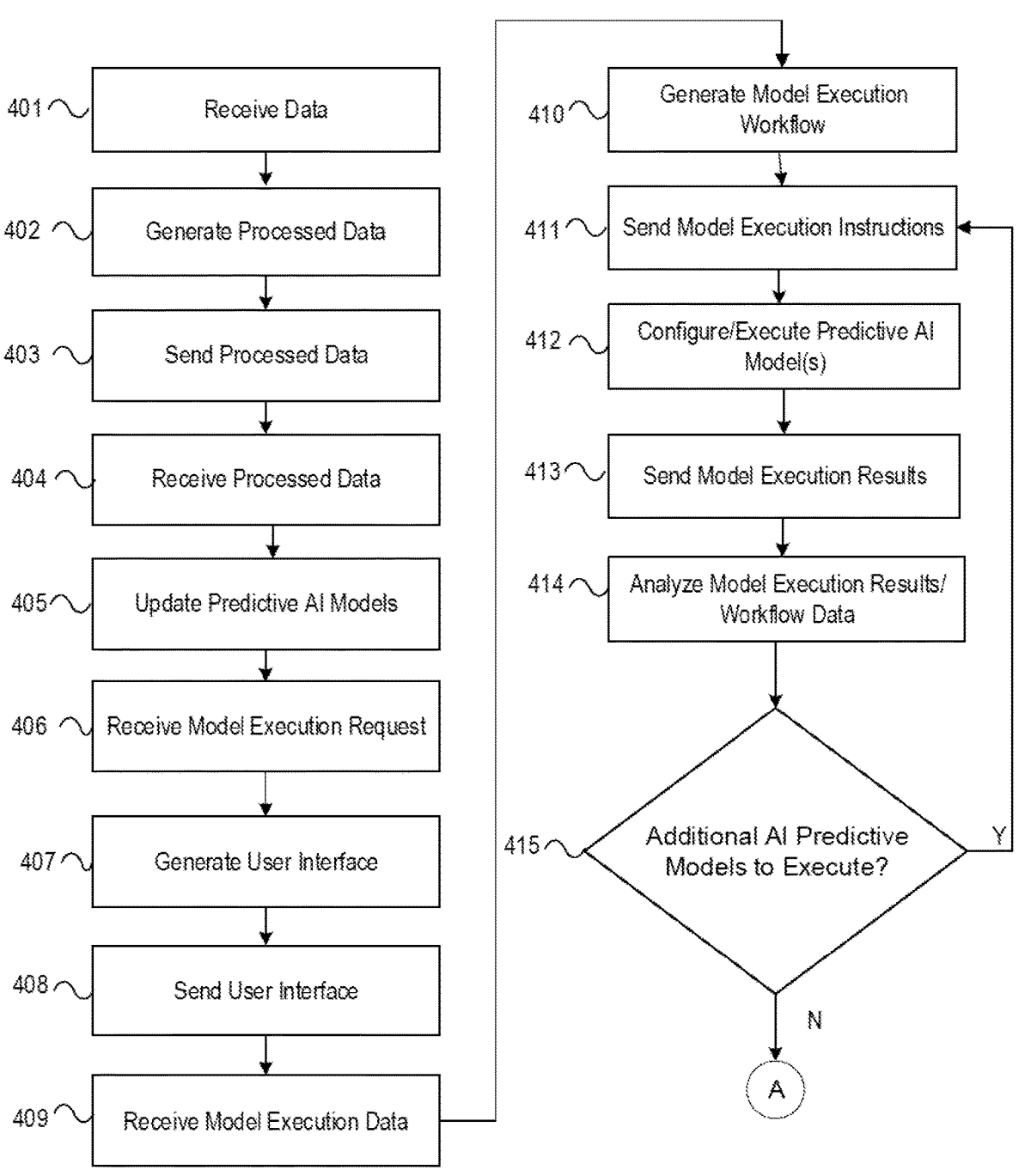

401 — Receive Data

402 — Generate Processed Data

403 — Send Processed Data

404 — Receive Processed Data

405 — Update Predictive AI Models

406 — Receive Model Execution Request

407 — Generate User Interface

408 — Send User Interface

409 — Receive Model Execution Data

410 — Generate Model Execution Workflow

411 — Send Model Execution Instructions

412 — Configure/Execute Predictive AI Model(s)

413 — Send Model Execution Results

414 — Analyze Model Execution Results/ Workflow Data

415 — Additional AI Predictive Models to Execute?

PREDICTIVE ARTIFICIAL INTELLIGENCE MODEL GENERATION AND EXECUTION

BACKGROUND

Aspects of the disclosure relate to an artificial intelligence (AI) predictive model generation and execution system that implements a predictive AI modeling process. In particular, one or more aspects of the disclosure relate to a computing system that receives data streams from various data sources, uses data from those data streams to generate and train predictive AI models, and then uses those predictive AI models to generate predictions and/or recommendations for users that are based on data specific to the user.

Enterprise organizations often fail to identify accurate predictions or recommendations for users because of the technical difficulty of having enough processing resources traditionally required to gather and process vast amounts of user data. Moreover, traditional computing systems lack the technical capability to effectively share this user data and user predictions or recommendations among various enterprise organizations.

SUMMARY

Aspects of the disclosure provide effective, efficient, scalable, and convenient technical solutions that address and overcome the technical problems associated with generating effective recommendations or predictions by implementing a predictive AI model generation and execution system that implements predictive AI modeling process. In accordance with one or more embodiments of the disclosure, a predictive AI model generation and execution system may include a data exchange computing engine, a model generation and execution computing engine, a workflow management computing engine, and a client interface computing engine. The data exchange computing engine may comprise a first processor, a first communication interface communicatively coupled to the first processor, and first memory storing computer-readable instructions that, when executed by the first processor, cause the data exchange computing engine to receive one or more data streams, process the one or more data streams in-real time to generate processed data, and send the processed data to the model generation and execution computing engine.

The model generation and execution computing engine may comprise a second processor, a second communication interface communicatively coupled to the first processor, and second memory storing computer-readable instructions that, when executed by the second processor, cause the model generation and execution computing engine to receive the processed data from the data exchange computing engine, and update a first predictive artificial intelligence model using the processed data.

The client interface computing engine may comprise a third processor, a third communication interface communicatively coupled to the third processor, and third memory storing computer-readable instructions that, when executed by the third processor, cause the client interface computing engine to receive a model execution request, generate, in response to receiving the model execution request, a first graphical user interface, send the first graphical user interface to an external client computing system, wherein sending the first graphical user interface to the external client computing system causes the external client computing system to output the first graphical user interface to a display device, receive, from the external client computing system, model execution data, and send, to the workflow management computing engine, the model execution data.

The workflow management computing engine may comprise a fourth processor, a fourth communication interface communicatively coupled to the fourth processor, and fourth memory storing computer-readable instructions that, when executed by the fourth processor, cause the workflow management computing engine to generate one or more model execution instructions based on the model execution data, and send the one or more model execution instructions to the model generation and execution computing engine.

In one or more instances, a first data stream of the one or more data streams may be received continuously. In another one or more instances, a second data stream of the one or more data streams may be received periodically.

In one or more instances, processing the one or more data streams may comprise removing redundant data. In one or more instances, processing the one or more data streams may further comprise anonymizing data from the one or more data streams.

In one or more instances, the second memory may store computer-readable instructions that, when executed by the second processor, cause the model generation and execution computing engine to receive the one or more model execution instructions and execute one or more predictive artificial intelligence models based on the one or more model execution instructions. In one instance, the one or more predictive artificial intelligence models may be executed in parallel. In another instance, the one or more predictive artificial intelligence models may be executed sequentially. In this instance, output data generated from executing a first predictive artificial intelligence model may be used as input data for executing a second predictive artificial intelligence model. In one or more instances, the output data may be sent from the model generation and execution computing engine to the workflow management computing engine.

In accordance with one or more embodiments, a method is provided at a predictive AI model generation and execution system that includes a data exchange computing engine, a model generation and execution computing engine, a workflow management computing engine, and a client interface computing engine.

The method at the data exchange computing engine, which may comprise a first processor, a first communication interface communicatively coupled to the first processor, and first memory, may comprise receiving one or more data streams, processing the one or more data streams in-real time to generate processed data, and sending the processed data to the model generation and execution computing engine.

The method at the model generation and execution computing engine, which may comprise a second processor, a second communication interface communicatively coupled to the first processor, and a second memory, may comprise receiving the processed data from the data exchange computing engine, and updating a first predictive artificial intelligence model using the processed data.

The method at the client interface computing engine, which may comprise a third processor, a third communication interface communicatively coupled to the third processor, and third memory, may comprise receiving a model execution request, generating, in response to receiving the model execution request, a first graphical user interface, sending the first graphical user interface to an external client computing system, wherein sending the first graphical user interface to the external client computing system causes the external client computing system to output the first graphical user interface to a display device, receiving, from the external client computing system, model execution data, and sending, to the workflow management computing engine, the model execution data.

The method at the workflow management computing engine, which may comprise a fourth processor, a fourth communication interface communicatively coupled to the fourth processor, and fourth memory, may comprise generating, based on the model execution data, one or more model execution instructions, and sending, to the model generation and execution computing engine, the one or more model execution instructions.

In one or more instances, a first data stream of the one or more data streams may be received continuously. In another one or more instances, a second data stream of the one or more data streams may be received periodically.

In one or more instances, processing the one or more data streams may comprise removing redundant data. In one or more instances, processing the one or more data streams may further comprise anonymizing data from the one or more data streams.

In one or more instances, the method at the model generation and execution computing engine may further comprise receiving the one or more model execution instructions, and executing, based on the one or more model execution instructions, one or more predictive artificial intelligence models. In one instance, the one or more predictive artificial intelligence models may be executed in parallel. In another instance, the one or more predictive artificial intelligence models may be executed sequentially. In this instance, output data generated from executing a first predictive artificial intelligence model may be used as input data for executing a second predictive artificial intelligence model. In one or more instances, the output data may be sent from the model generation and execution computing engine to the workflow management computing engine.

In accordance with one or more embodiments, a plurality of non-transitory computer-readable media may be provided, and may include a first non-transitory computer-readable media storing instructions that, when executed by a data exchange computing engine comprising a first processor, a first communication interface communicatively coupled to the first processor, and first memory, cause the data exchange computing engine to receive one or more data streams, process the one or more data streams in-real time to generate processed data, and send, to a model generation and execution computing engine, the processed data.

The plurality of non-transitory computer-readable media may further include a second non-transitory computer-readable media storing instructions that, when executed by the model generation and execution computing engine comprising a second processor, a second communication interface, and a second memory, cause the model generation and execution computing engine to receive the processed data from the data exchange computing engine, and update a first predictive artificial intelligence model using the processed data.

The plurality of non-transitory computer-readable media may further include a third non-transitory computer-readable media storing instructions that, when executed by a client interface computing engine comprising a third processor, a third communication interface communicatively coupled to the third processor, and third memory, cause the client interface computing engine to receive a model execution request, generate, in response to receiving the model execution request, a first graphical user interface, send the first graphical user interface to an external client computing system, wherein sending the first graphical user interface to the external client computing system causes the external client computing system to output the first graphical user interface to a display device, receive, from the external client computing system, model execution data, and send, to a workflow management computing engine, the model execution data.

The plurality of non-transitory computer-readable media may further include a fourth non-transitory computer-readable media storing instructions that, when executed by the workflow management computing engine comprising a fourth processor, a fourth communication interface communicatively coupled to the fourth processor, and fourth memory, cause the workflow management computing engine to generate, based on the model execution data, one or more model execution instructions, and send, to the model generation and execution computing engine, the one or more model execution instructions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2K depict an illustrative event sequence for a predictive AI model generation and execution system that implements a predictive AI modeling process in accordance with one or more example embodiments;

FIGS. 4A-4B depict an illustrative method for implementing a predictive AI model generation and execution system that implements a predictive AI modeling process in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe systems and methods for implementing a predictive AI model generation and execution system that implements a predictive AI modeling process. The predictive AI model generation and execution system may include a plurality of engines, including a data exchange computing engine, a model generation and execution computing engine, a workflow management computing engine, and a client interface computing engine. The predictive AI model generation and execution system, and each of the data exchange computing engine, the model generation and execution computing engine, the workflow management computing engine, and the client interface computing engine may include a processor, communication interface, and memory.

The predictive AI model generation and execution system may be maintained by an enterprise organization. In order to efficiently and optimally identify targeted offers for a user and/or different enterprise organization, the enterprise organization may utilize the data exchange computing engine, the model generation and execution computing engine, and the workflow management computing engine to generate, execute, and update one or more predictive AI models. The predictive AI models may be initially generated using data streams received by various internal and external data sources. The data streams may be processed to eliminate redundant and/or sensitive data prior to being used to generate and/or update the predictive AI models. Individual users and/or users from various enterprise organizations may request to execute the predictive AI models using user-selected input data. In addition, the enterprise organization that maintains the predictive AI model generation and execution system may continuously run particular AI predictive models for one or more users to identify targeted offers for those users.

Figure 1A:
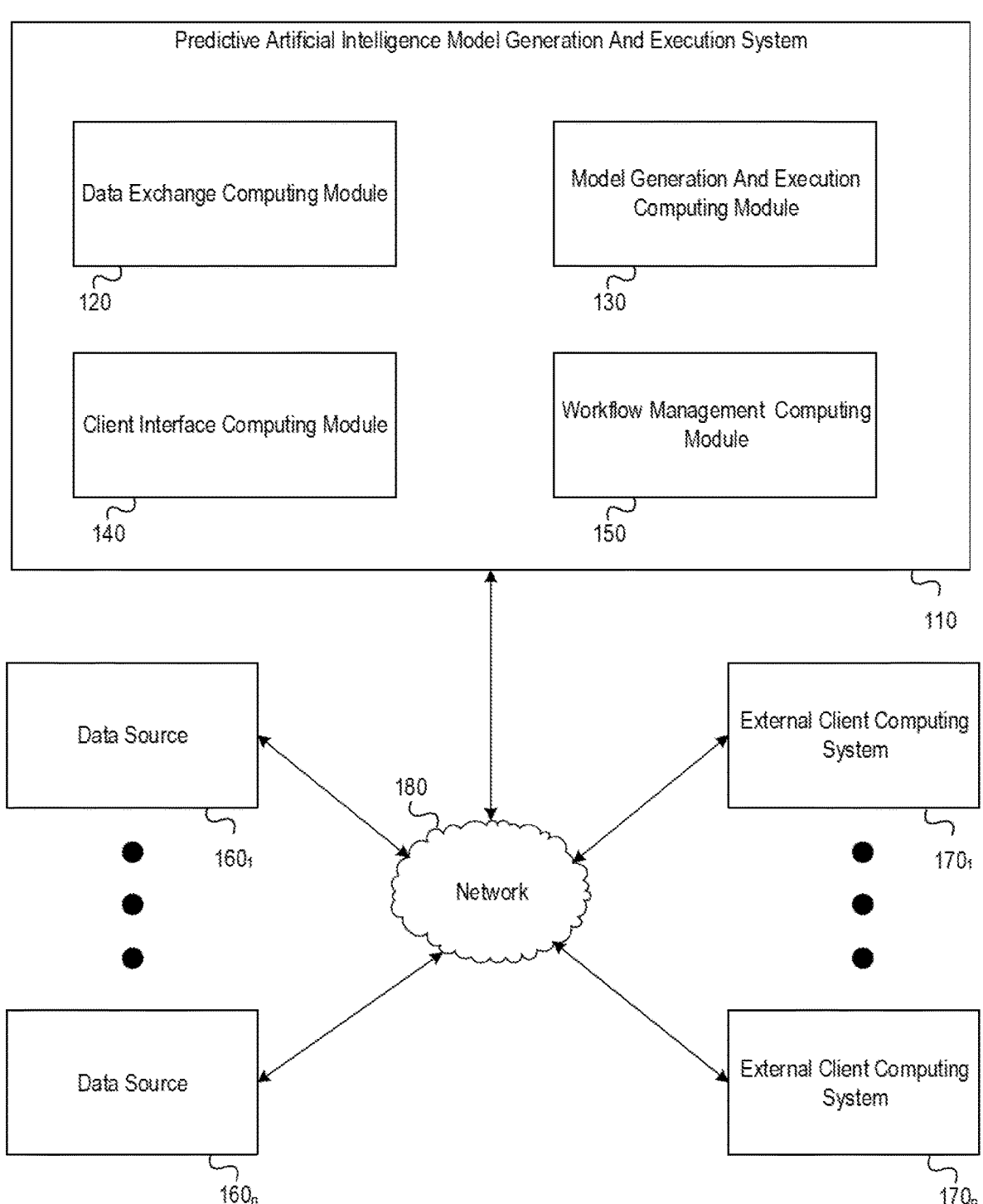
FIGS. 1A-1B depict an illustrative computing environment for a predictive AI model generation and execution system that implements a predictive AI modeling process in accordance with one or more example embodiments.
Figure 1B:
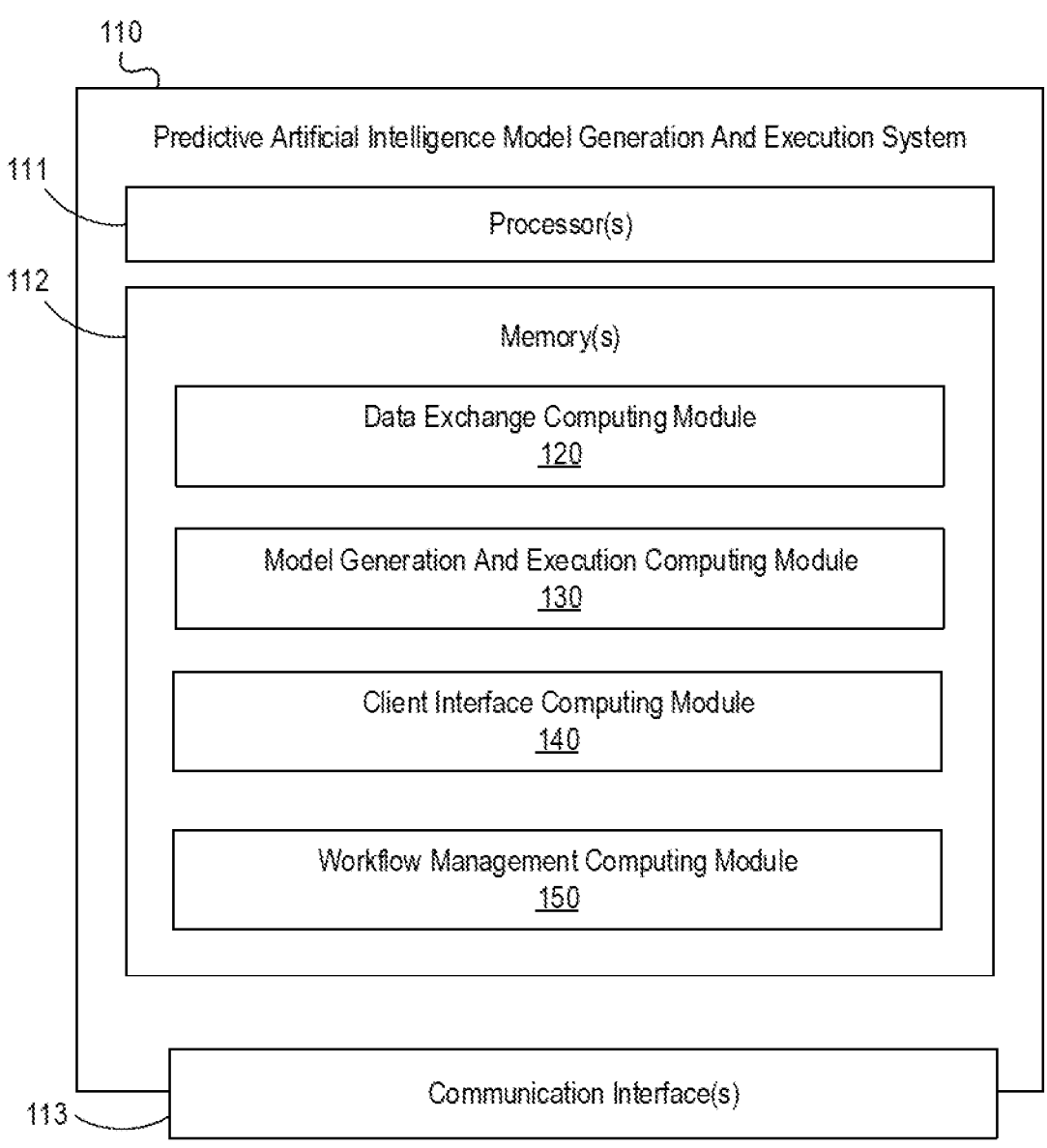

FIGS. 1A-1B depict an illustrative computing environment including a predictive AI model generation and execution system that implements a predictive AI modeling process in accordance with one or more example embodiments. FIG. 1A depicts an illustrative computing environment that implements a plurality of computing engines of the predictive AI model generation and execution system, including a data exchange computing engine, a model generation and execution computing engine, a workflow management computing engine, and a client interface computing engine.

Referring to FIG. 1A, computing environment 100 may include a network 180 that interconnects various computing engines and devices within the computing environment 100. Computing environment may include a predictive AI model generation and execution system 110. Predictive AI model generation and execution system 110 may include data exchange computing engine 120, model generation and execution computing engine 130, client interface computing engine 140, and workflow management computing engine 150. Data exchange computing engine 120, model generation and execution computing engine 130, client interface computing engine 140, and workflow management computing engine 150 may work together to implement a predictive AI modeling process.

Predictive AI model generation and execution system 110 may be connected to one or more networks, such as network 180. Computing environment 100 may further include data sources $160_1 \ldots 160_n$, which may be connected to predictive AI model generation and execution system 110 via network 180. Finally, computing environment may include one or more external client computing systems, such as external client computing systems $170_1 \ldots 170_n$, that may be connected to network 180. The one or more networks in computing environment 100 may interconnect one or more of predictive AI model generation and execution system 110 (including data exchange computing engine 120, model generation and execution computing engine 130, client interface computing engine 140, and workflow management computing engine 150), data sources $160_1 \ldots 160_n$, and external client computing systems $170_1 \ldots 170_n$.

As described further below, each of predictive AI model generation and execution system 110, data exchange computing engine 120, model generation and execution computing engine 130, client interface computing engine 140, and workflow management computing engine 150 may be a computer system that includes one or more computing devices (e.g., servers, server blades, or the like) and/or other computer components (e.g., processors, memories, communication interfaces) that may be used to implement a predictive AI modeling process. In some instances, one or more of predictive AI model generation and execution system 110, data exchange computing engine 120, model generation and execution computing engine 130, client interface computing engine 140, and workflow management computing engine 150 may be controlled or otherwise maintained by an enterprise organization such as a financial institution.

Each of external client computing systems $170_1 \ldots 170_n$ may be a computer system that includes one or more computing devices (e.g., servers, server blades, laptop computers, desktop computers, mobile devices, tablets, smartphones, credit card readers, or the like) and/or other computer components (e.g., processors, memories, communication interfaces) that may be used to perform enterprise operations and/or a predictive AI modeling process. In one or more instances, these external client computing systems $170_1 \ldots 170_n$ may be configured to communicate with predictive AI model generation and execution system 110 (including data exchange computing engine 120, model generation and execution computing engine 130, client interface computing engine 140, and workflow management computing engine 150) to implement a predictive AI modeling process.

In one or more arrangements, each of predictive AI model generation and execution system 110, data exchange computing engine 120, model generation and execution computing engine 130, client interface computing engine 140, workflow management computing engine 150, data sources $160_1 \ldots 160_n$, and external client computing systems $170_1 \ldots 170_n$ may be any type of computing device capable of sending data streams, receiving data streams, sending model execution requests, and/or implementing a predictive AI modeling process, accordingly. For example, predictive AI model generation and execution system 110, data exchange computing engine 120, model generation and execution computing engine 130, client interface computing engine 140, workflow management computing engine 150, data sources $160_1 \ldots 160_n$, and external client computing systems $170_1 \ldots 170_n$, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of predictive AI model generation and execution system 110, data exchange computing engine 120, model generation and execution computing engine 130, client interface computing engine 140, workflow management computing engine 150, data sources $160_1 \ldots 160_n$, and external client computing systems $170_1 \ldots 170_n$ may, in some instances, be special-purpose computing devices configured to perform specific functions.

Referring to FIG. 1B, predictive AI model generation and execution system 110 may include one or more processors 111, memory 112, and communication interface 113. A data bus may interconnect processor 111, memory 112, and communication interface 113. Communication interface 113 may be a network interface configured to support communication between predictive AI model generation and execution system 110 and one or more networks (e.g., network 180 or the like). Memory 112 may include one or more program engines having instructions that when executed by processor 111, predictive AI model generation and execution system 110 to perform one or more functions described herein and/or one or more databases that may store and/or otherwise maintain information which may be used by such program engines and/or processor 111. In some instances, the one or more program engines and/or databases may be stored by and/or maintained in different memory units of predictive AI model generation and execution system 110 and/or by different computing devices that may form and/or otherwise make up predictive AI model generation and execution system 110. For example, memory 112 may have, host, store, and/or include data exchange computing engine 120, model generation and execution computing engine 130, client interface computing engine 140, and workflow management computing engine 150. Each of data exchange computing engine 120, model generation and execution computing engine 130, client interface computing engine 140, workflow management computing engine 150 may include its own memory (similar to memory 112) and/or processor(s) (similar to processor 111) to perform the functionality of these engines are described herein.

Data exchange computing engine 120 may have instructions that direct and/or cause predictive AI model generation and execution system 110 to, for instance, receive one or more data streams, process the one or more data streams in-real time to generate processed data, and send the processed data to the model generation and execution computing engine 130. The model generation and execution computing engine 130 may have instructions that direct and/or cause predictive AI model generation and execution system 110 to, for instance, receive the processed data from the data exchange computing engine 120, and update one or more predictive artificial intelligence models using the processed data. The client interface computing engine 140 may have instructions that direct and/or cause predictive AI model generation and execution system 110 to, for instance, receive a model execution request from an external client computing system, generate a first graphical user interface, send the first graphical user interface to the external client computing system, receive model execution data from the external client computing system, and send the model execution data to the workflow management computing engine 150. The workflow management computing engine 150 may have instructions that direct and/or cause predictive AI model generation and execution system 110 to, for instance, generate one or more model execution instructions based on the model execution data, and send the one or more model execution instructions to the model generation and execution computing engine 130.

FIGS. 2A-2K depict an illustrative event sequence for a predictive AI model generation and execution system that implements a predictive AI modeling process in accordance with one or more example embodiments. Aspects of the illustrative event sequence described herein provide effective, efficient, scalable, and convenient technical solutions that address and overcome the technical problems associated with generating targeted offers and/or services for a user.

Figure 2A:
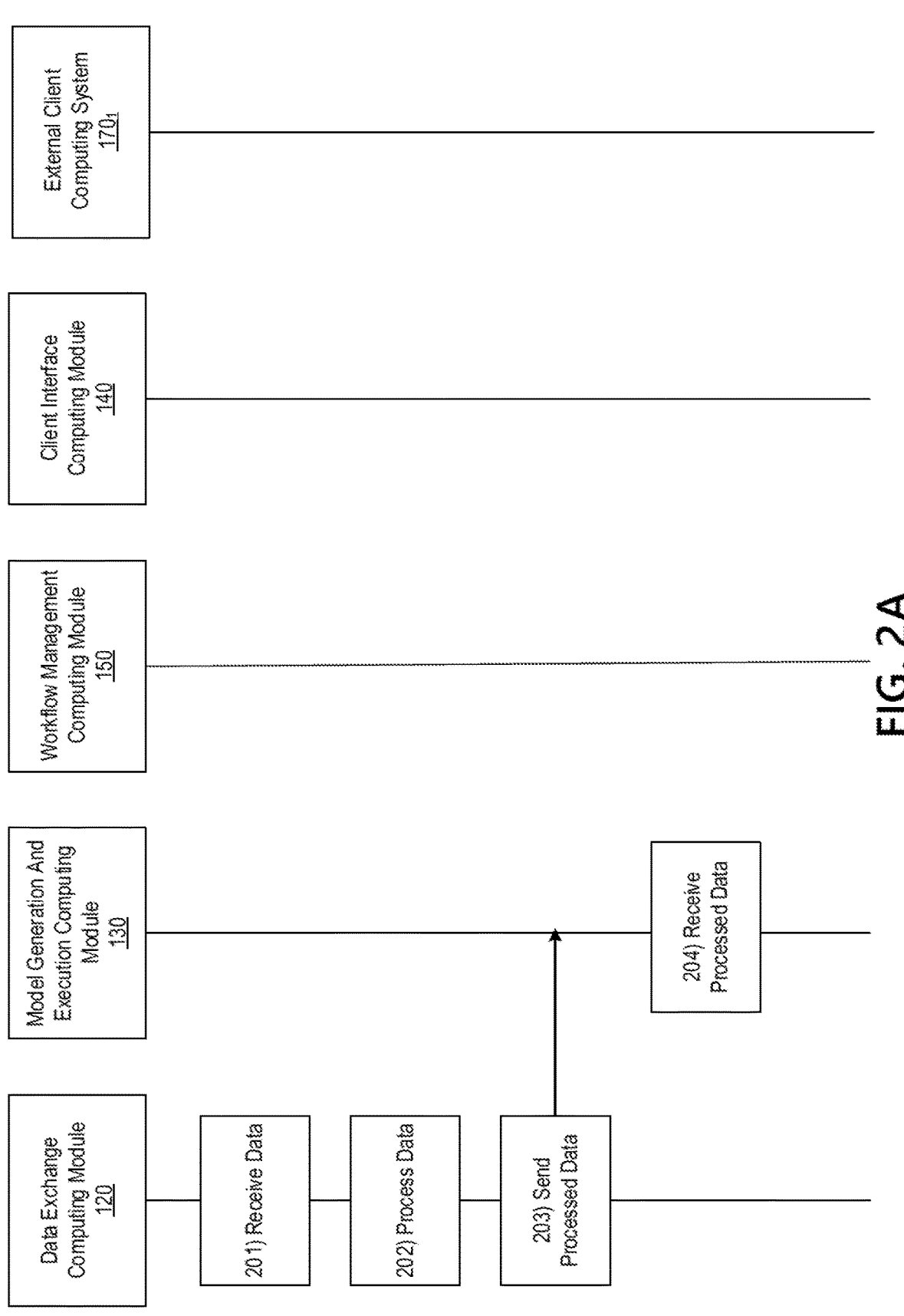

Referring to FIG. 2A, at step 201, data exchange computing engine 120 of predictive AI model generation and execution system 110 may receive one or more data streams. Data exchange computing engine 120 may receive a first subset of these one or more data streams continuously and a second subset of these one or more data streams periodically. Each of the one or more data streams may be received from an internal data source (for example, a computing system of the enterprise organization) or an external data source (for example, a computing system of a different enterprise organization). The data stream may be related to a user (such as a customer of an enterprise organization or potential customer of an enterprise organization), a plurality of users (such as a plurality of customers of an enterprise organization or a plurality of potential customers of an enterprise organization), one or more assets of a user or a plurality of users (such as one or more physical assets of a user or a plurality of users, one or more financial assets of a user or a plurality of users, one or more virtual assets of a user or a plurality of users, and/or the like), an enterprise organization (such as financial data of the enterprise organization, assets of the enterprise organization, services offered by the enterprise organization), and/or the like.

At step 202, data exchange computing engine 120 of predictive AI model generation and execution system 110 may process data from the one or more data streams received by data exchange computing engine 120 at step 201. Data exchange computing engine 120 may process the data in real-time as it comes in (e.g., data exchange computing engine 120 may process the data continuously in real-time or periodically in real-time), or may process the data in batches. Processing the data may comprise any number of data analysis processes, such as redundancy elimination, anonymization, and/or the like. As indicated above, data exchange computing engine 120 may receive data streams for any number of individuals and/or enterprise organizations from multiple internal and/or external data sources. This may increase the possibility that data exchange computing engine 120 may receive, for any given user, data that is duplicative of data that has previously been received for that user. Moreover, given the sensitive nature of the data that may be contained in the data streams received by data exchange computing engine 120 at step 201, data exchange computing engine 120 may process the data by removing any information from the data that identifies the user in order to protect the privacy interests of users (whether those users be individuals or enterprise organizations). For example, names, addresses, phone numbers, social security numbers, and/or the like may be removed from the data and in its place, the data may be tagged with anonymizing usernames, pseudonyms, identification numbers, and/or the like. This allows data exchange computing engine 120 to maintain an association between the data and the subject of the data (which is needed, for example, for redundancy elimination) without the association revealing the actual identity of the user. For redundancy elimination, data exchange computing engine 120 may analyze the data to determine whether the incoming data (e.g., data that is received at step 201) that is subsequently tagged by data exchange computing engine 120 with a username, pseudonym, or identification number, matches historical data that was previously tagged with the same username, pseudonym, or identification number. If so, data exchange computing engine 120 may compare the incoming data with the historical data to determine whether there is any redundancy. If there is redundancy, data exchange computing engine 120 may delete the redundant data.

The tagging of the data by data exchange computing engine 120 may allow data exchange computing engine 120 to create individual user profiles for various users. These user profiles may serve as digital ledgers of a user's tangible and intangible assets, which in turn may be utilized to provide targeted offers directly to the users (or via intervening enterprise organizations) for various products and/or services. In order to generate such a user profile, data exchange computing engine 120 may receive data streams from various external sources, such as retailers and service providers. The retailers and/or service providers may track the goods and/or services purchased by users, and then provide this information to data exchange computing engine 120. Data exchange computing engine 120 may tag this data using privacy-centric user identifying information, which allows the system to both provide users with targeted advertisements for products and/or services that would be of interest to the users without relying on sensitive user information. The retailers and/or service providers might not be restricted to any specific industry, and may include a utility company, a telecommunications company, a credit card company, a healthcare services company, a pharmaceutical company, real estate service providers, auto repair services, home goods retailers, appliance repair companies, automobile retailers, advertisers, financial service providers (banks, loan companies), clothing retailers, legal service providers, internet service providers (e.g., to track a user's online browsing, searching, and/or purchasing activities), IoT data (e.g., data from sensors around a user's home, data from user appliances in the user's home, etc.) and/or the like. Data exchange computing engine 120 may tag all of the data received from each of these external sources. These tags may then be utilized by model generation and execution computing engine 130 in training its models, which in turn may be used to not only generate predictive outputs related to a single retailer and/or service provider but to also generate predictive outputs across a plurality of different retailers and/or service providers.

For example, data from a home goods retailer may indicate that a particular user recently purchased (or expressed interest in) a new home. When inputted into one or more of the models of model generation and execution computing engine 130 of predictive AI model generation and execution system 110 (discussed below), those models may generate a predictive output that the user is likely to need a variety of other goods and services either in the immediate future or within a predetermined time frame. For example, the one or more models may predict that the user will likely require a loan, a new HVAC system, various home insurance services, and/or the like. These predictive outputs may then be utilized by the system to provide targeted offerings for these various products and services to the user. Additionally, or alternatively, the enterprise organization associated with predictive AI model generation and execution system 110 may sell this information to the various enterprise organizations that provide these products and/or services, which in turn may offer the products and/or services to the user.

At step 203, data exchange computing engine 120 may send the processed data to model generation and execution computing engine 130. Data exchange computing engine 120 may send the processed data to model generation and execution computing engine 130 by sending the processed data itself or by storing the processed data in a location that is accessible by both data exchange computing engine 120 and model generation and execution computing engine 130 and then sending the storage location to model generation and execution computing engine 130. At step 204, model generation and execution computing engine 130 may receive the processed data from data exchange computing engine 120. Model generation and execution computing engine 130 may receive the processed data from data exchange computing engine 120 by receiving the processed data itself or by retrieving the processed data from the storage location identified by data exchange computing engine 120 at step 203. In either instance, model generation and execution computing engine 130 may locally store the processed data received from data exchange computing engine 120.

Figure 2B:
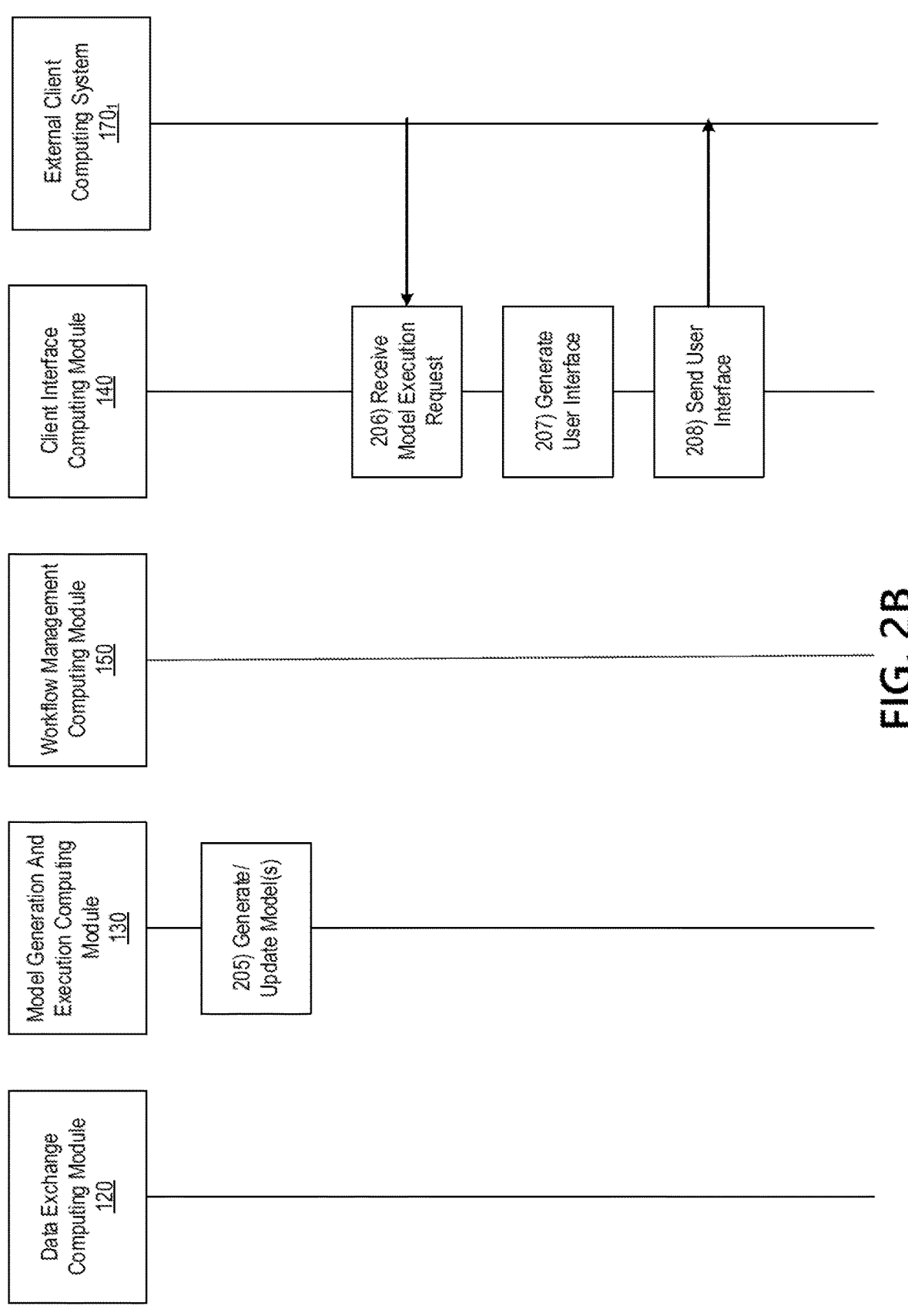

Referring to FIG. 2B, at step 205, model generation and execution computing engine 130 may generate a new predictive artificial intelligence (AI) model using the processed data received from data exchange computing engine 120 at step 204 and/or update one or more existing predictive AI models using the processed data received from data exchange computing engine 120 at step 204. In one instance, data exchange computing engine 120 may provide instructions to model generation and execution computing engine 130 on whether a new predictive AI model is to be generated using the processed data, whether one or more existing predictive AI models are to be updated using the processed data (along with the identity of the existing predictive AI models to be updated), or both. Data exchange computing engine 120 may send these instructions prior to sending the processed data to model generation and execution computing engine 130, concurrent to sending the processed data to model generation and execution computing engine 130 (e.g., at step 204), or after sending the processed data to model generation and execution computing engine 130. In another instance, model generation and execution computing engine 130 may automatically analyze the data and determine whether the processed data should be used to generate a new predictive AI model, update one or more existing predictive AI models, or both. To do this, model generation and execution computing engine 130 may analyze the contents of the data itself to determine which predictive AI models need to be updated based on the processed data. For example, model generation and execution computing engine 130 may examine the usernames, pseudonyms, identification numbers, etc. that were tagged to the data by data exchange computing engine 120. Model generation and execution computing engine 130 may then determine if any existing predictive AI models were tagged with the same usernames, pseudonyms, identification numbers, and/or the like, and if so, may train the existing predictive AI model(s) using the processed data. In another example, model generation and execution computing engine 130 may look at the context of the data (for example, the processed data may be related to physical assets owned or purchased by one or more users or related to one or more services provided by a particular enterprise organization) and determine if any existing predictive AI models are tagged with data indicating a matching context. If so, model generation and execution computing engine 130 may train the matching existing predictive AI models using the processed data. In yet another example, model generation and execution computing engine 130 may generate and train a new predictive AI model based on the processed data received from data exchange computing engine 120.

Each of the existing models of model generation and execution computing engine 130 may be a predictive AI model. These predictive AI models may have been previously generated and trained by model generation and execution computing engine 130 and/or imported into model generation and execution computing engine 130. Model generation and execution computing engine 130 may continuously update its existing predictive AI models using new training data in the form of the processed data that model generation and execution computing engine 130 receives from data exchange computing engine 120. The predictive AI models may take in one or more inputs and utilize one or more algorithm-based neural networks to generate one or more predictive outputs. The one or more algorithms may include supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, a combinations thereof, and/or the like. The continuous updating and training of these predictive AI models by model generation and execution computing engine 130 using the processed data received from data exchange computing engine 120 allows the models to become more accurate and efficient over time. As discussed below, model generation and execution computing engine 130 may also train the predictive AI models using outputs generated by these predictive AI models, which similarly allows the models to become more accurate and efficient over time.

Although the steps of 201-205 are shown as occurring once, this is solely for purposes of ease of illustration, and it is understood that these steps are continuously and repeatedly performed by data exchange computing engine 120 and/or model generation and execution computing engine 130. That is, these steps are part of a loop in which data exchange computing engine 120 continuously receives one or more data streams from external and/or internal data sources, data exchange computing engine 120 continuously processes the data in those data streams to generate processed data, data exchange computing engine 120 continuously sends that processed data to model generation and execution computing engine 130, model generation and execution computing engine 130 continuously receives the processed data from data exchange computing engine 120, and model generation and execution computing engine 130 continuously generates and/or updates one or more predictive AI models using the processed data received from data exchange computing engine 120. It is understood that data exchange computing engine 120 and/or model generation and execution computing engine 130 may continue to perform one or more of these steps in the background even while it is also performing additional functionality, discussed below.

Figure 3A:
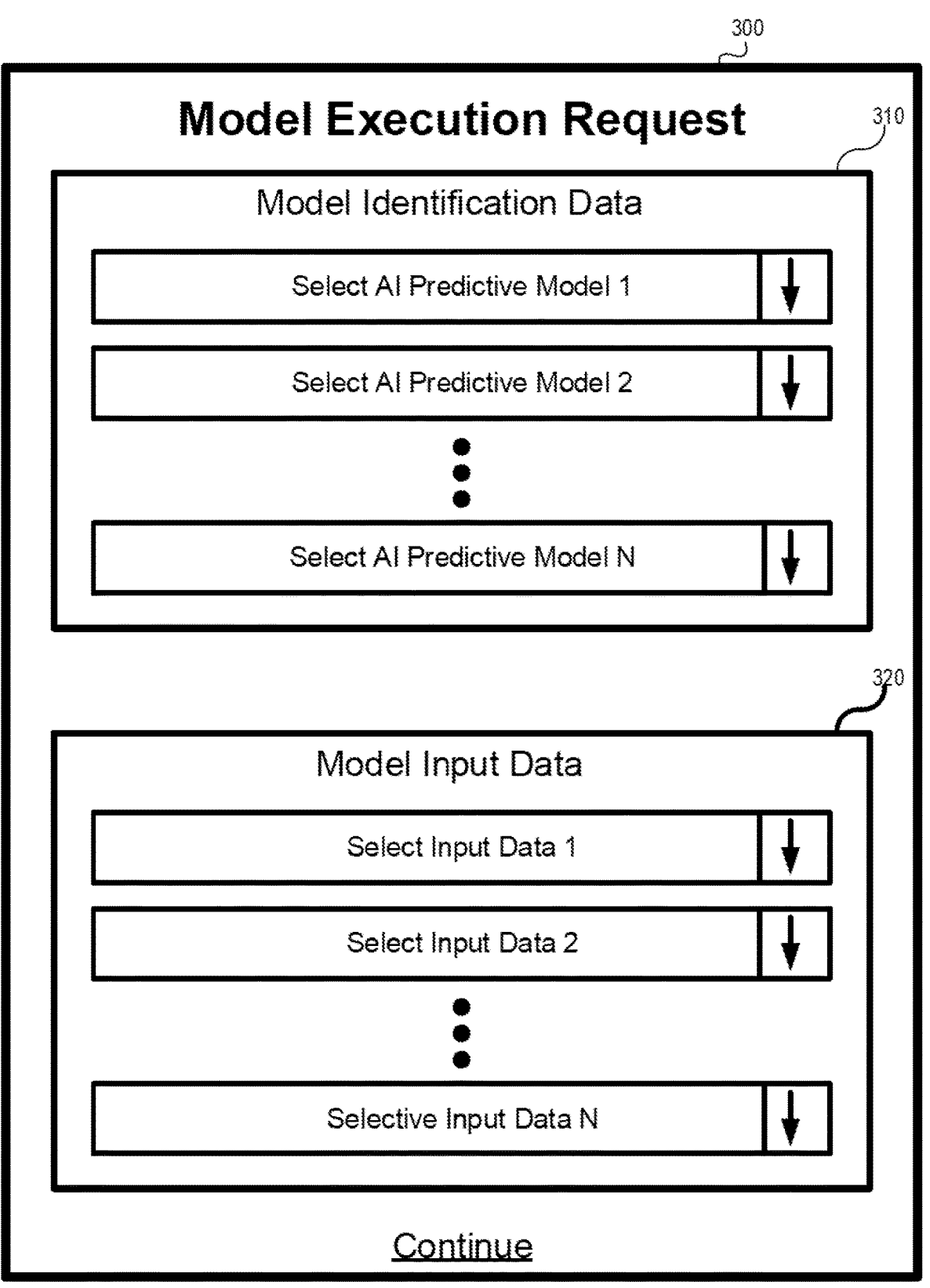
FIGS. 3A-3B depict illustrative graphical user interfaces utilized by a predictive AI model generation and execution system that implements a predictive AI modeling process in accordance with one or more example embodiments.

At step 206, client interface computing engine 140 may receive a model execution request from external client computing system 170₁. External client computing system 170₁ may be associated with an individual user or an enterprise organization. External client computing system 170₁ may utilize the one or more AI predictive models of predictive AI model generation and execution system 110 to request predictive data related to a user, product, service, enterprise organization, and/or the like. In response to receiving the model execution request at step 206, client interface computing engine 140 may, at step 207, generate a first graphical user interface. An illustrative first graphical user interface that may be generated by client interface computing engine 140 at step 206 is shown in FIG. 3A. Referring to FIG. 3A, first graphical user interface 300 includes sections 310 and sections 320. Section 310 of first graphical user interface 300 may be utilized by the user of external client computing system 170₁ to select one or more predictive AI models to be executed by model generation and execution computing engine 130 of predictive AI model generation and execution system 110. The one or more predictive AI models selected by the user via section 310 of first graphical user interface 300 may be part of a larger workflow. In a first instance, the user may configure a workflow such that the results of an execution of a first predictive AI model may be used as inputs to the execution of a second predictive AI model. This may be repeated for as many predictive AI models that the user selects to execute. In a second instance, the user may configure a workflow that comprises parallel execution of a plurality of predictive AI models (each with the same or different inputs). This allows the user to run multiple predictive AI models independently and at once, thus providing the user with faster results.

Section 320 of first graphical user interface 300 may be utilized by the user of external client computing system 170₁ to select the input data to be used for each of the predictive AI models selected by the user in section 310 of first graphical user interface 300. The user may upload the actual input data or a storage location of the input data. If the input data to be used by any given predictive AI model during execution of the workflow comprises the output of the execution of a different predictive AI model, the user may select to make that configuration using the drop-down menus of section 320 of first graphical user interface 300.

Figure 2C:
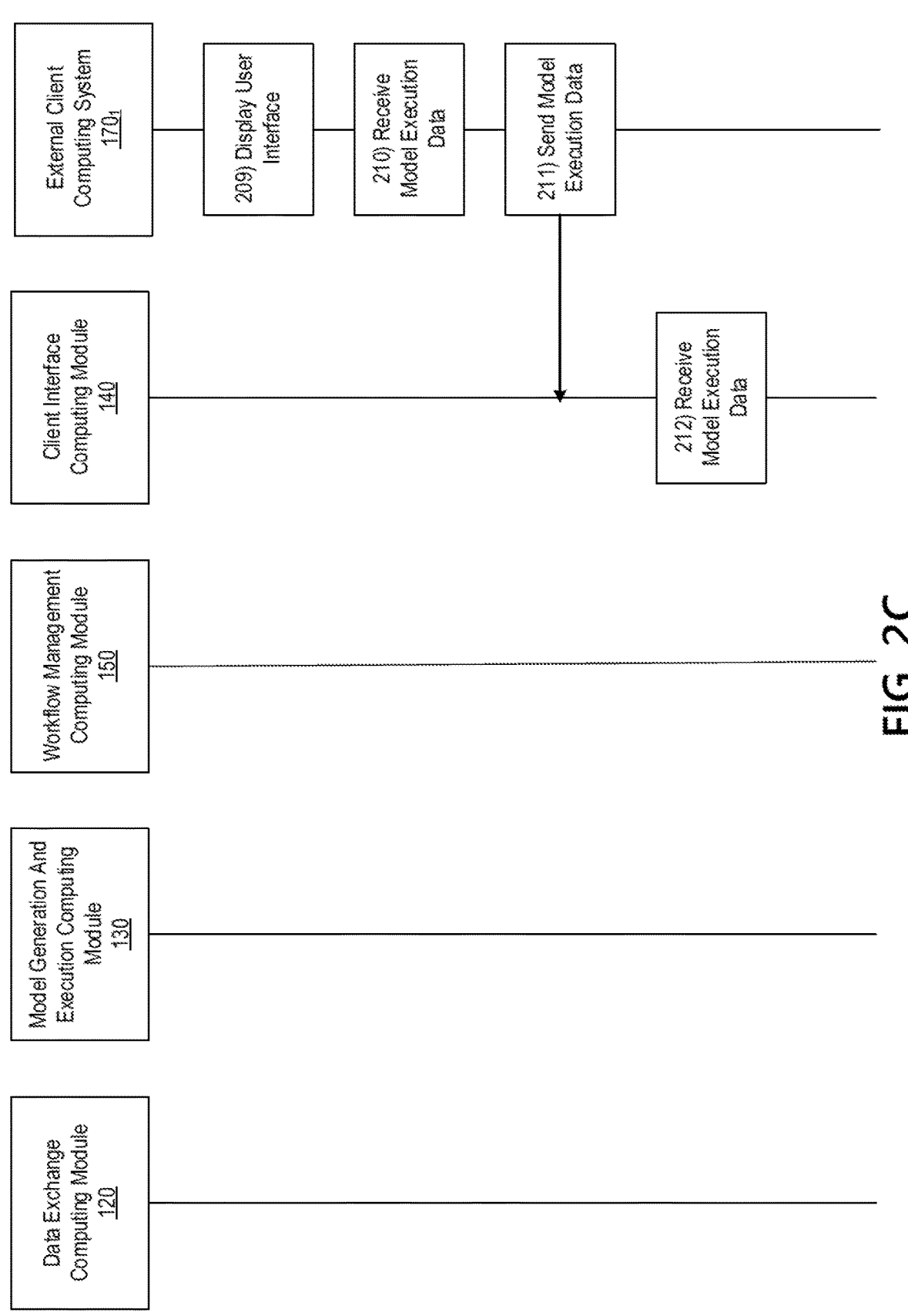

Referring back to FIG. 2B, client interface computing engine 140 may, at step 208, send the first graphical user interface 300 to external client computing system 170₁. With reference to FIG. 2C, at step 209, external client computing system 170₁ may receive and display the first graphical user interface 300 from client interface computing engine 140. One or more of sending the first graphical user interface 300 by client interface computing engine 140 or receiving the first graphical user interface 300 by external client computing system 170₁ may be configured to result in external client computing system 170₁ outputting, at step 209, the first graphical user interface 300 to a display device of external client computing system 170₁. At step 210, external client computing system 170₁ may receive model execution data for the model execution request. As discussed above with reference to FIG. 3A, the model execution data may include user selections of one or more predictive AI models to be executed by model generation and execution computing engine 130 of predictive AI model generation and execution system 110 and the input data to be used by model generation and execution computing engine 130 of predictive AI model generation and execution system 110 during execution of those predictive AI models. At step 211, external client computing system 170₁ may send the model execution data received via first graphical user interface 300 to client interface computing engine 140. At step 212, client interface computing engine 140 may receive the model execution data from external client computing system 170₁.

Figure 2D:
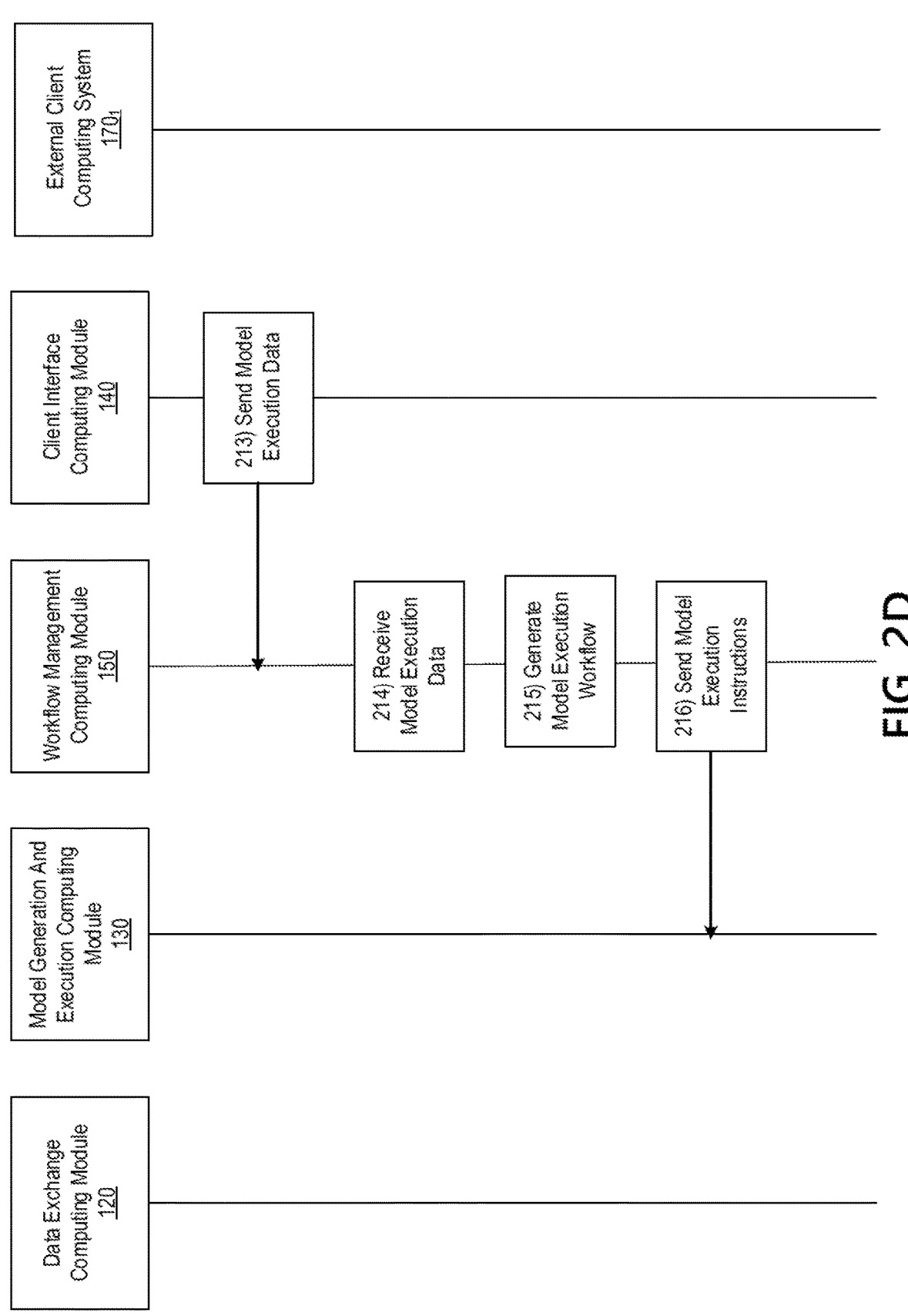

Referring to FIG. 2D, at step 213, client interface computing engine 140 may send the model execution data to workflow management computing engine 150. At step 214, workflow management computing engine 150 may receive the model execution data from client interface computing engine 140. As discussed above with reference to FIG. 3A, the selection of the predictive AI models by the user in section 310 of first graphical user interface 300 may collectively form a workflow configured by the user, wherein multiple predictive AI models are to be executed by model generation and execution computing engine 130 of predictive AI model generation and execution system 110. In a first instance, the workflow may comprise a plurality of user selected predictive AI models to be run sequentially, with the output of execution of a given predictive AI model to be used as input of execution of a different predictive AI model.

In a second instance, the workflow may comprise a plurality of user-selected predictive AI models to be run in parallel, with the same or different inputs. In a third instance, the workflow may comprise a single predictive AI model to be executed by model generation and execution computing engine 130.

At step 215, workflow management computing engine 150 may configure a model execution workflow comprising model execution instructions for model generation and execution computing engine 130 from the model execution data received by workflow management computing engine 150 at step 214. To configure the workflow, workflow management computing engine 150 may parse and analyze the model execution data to determine the specific predictive AI models that make up the workflow specified by the user, the timing of the execution of those predictive AI models (e.g., the sequence in which those predictive AI models are to be executed), and the instructions that are needed to complete the workflow execution. For example, if the model execution data received by workflow management computing engine 150 at step 214 indicated that only one predictive AI model is to be executed, the workflow generated by workflow management computing engine 150 may include instructions to model generation and execution computing engine 130 to execute the one predictive AI model using the input data identified in the model execution data received at step 214 and return the results of the model execution to workflow management computing engine 150.

In another example, if the model execution data received by workflow management computing engine 150 at step 214 indicated that two predictive AI models are to be executed sequentially, with the output of the execution of a first predictive AI model to be used in part at the input to the execution of a second predictive AI model, the workflow generated by workflow management computing engine 150 may include instructions to model generation and execution computing engine 130 to execute the first predictive AI model using the corresponding input data identified in the model execution data received at step 214 and to simply send the workflow management computing engine 150 a notification when execution of the first predictive AI model is complete.

In yet another example, if the model execution data received by workflow management computing engine 150 at step 214 indicated that two predictive AI models are to be executed in parallel, the workflow generated by workflow management computing engine 150 may include instructions to model generation and execution computing engine 130 to execute first and second predictive AI models in parallel, using first and second input data identified in the model execution data received at step 214, and to send the execution results to workflow management computing engine 150 only when execution of both the first and second predictive AI models has been completed. It is understood that the specifics of the workflow generated by workflow management computing engine 150 at step 215 may vary from these examples, depending on the specifics of the model execution data received by workflow management computing engine 150 from client interface computing engine 140 at step 214.

Figure 2E:
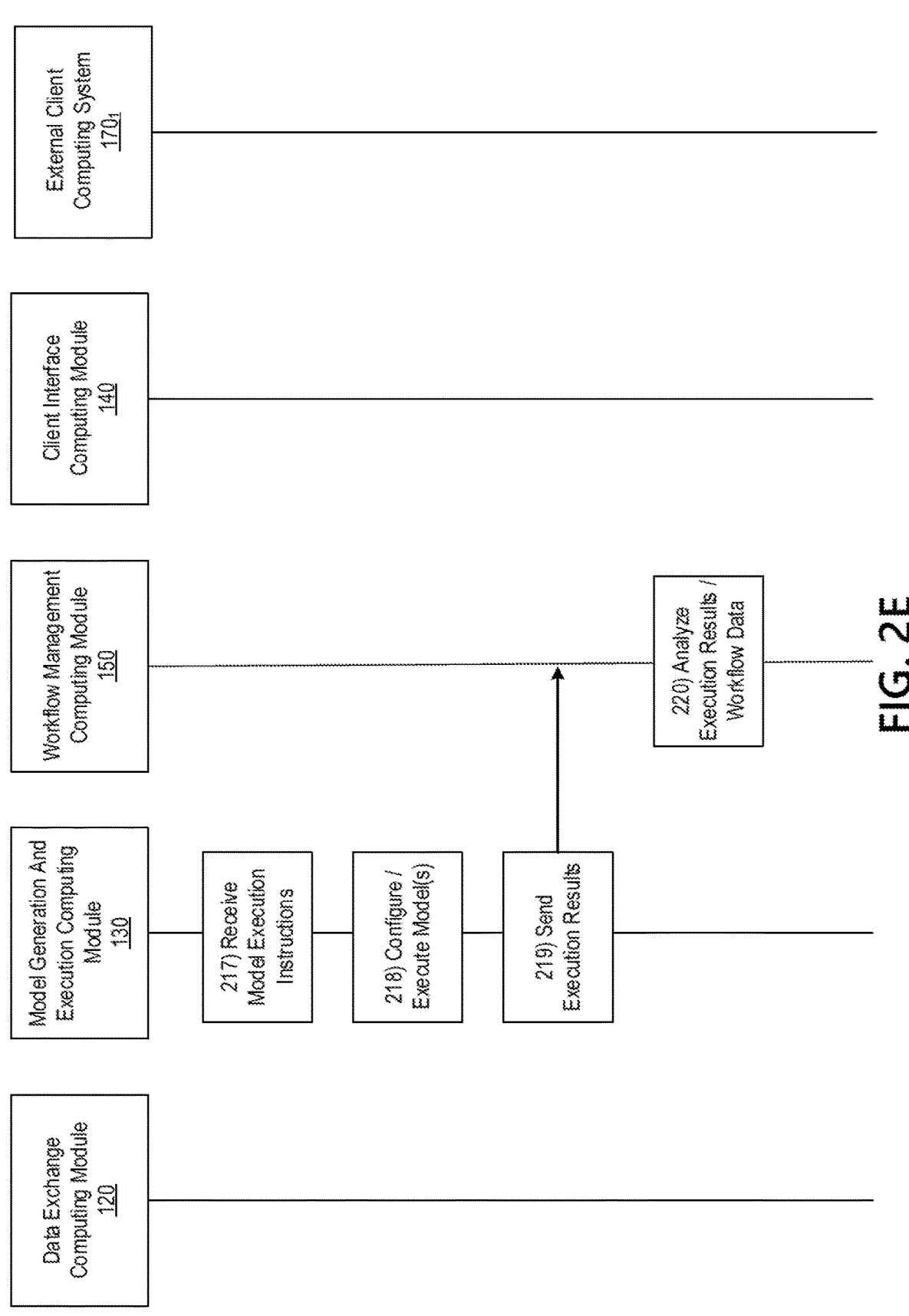
Figure 2F:
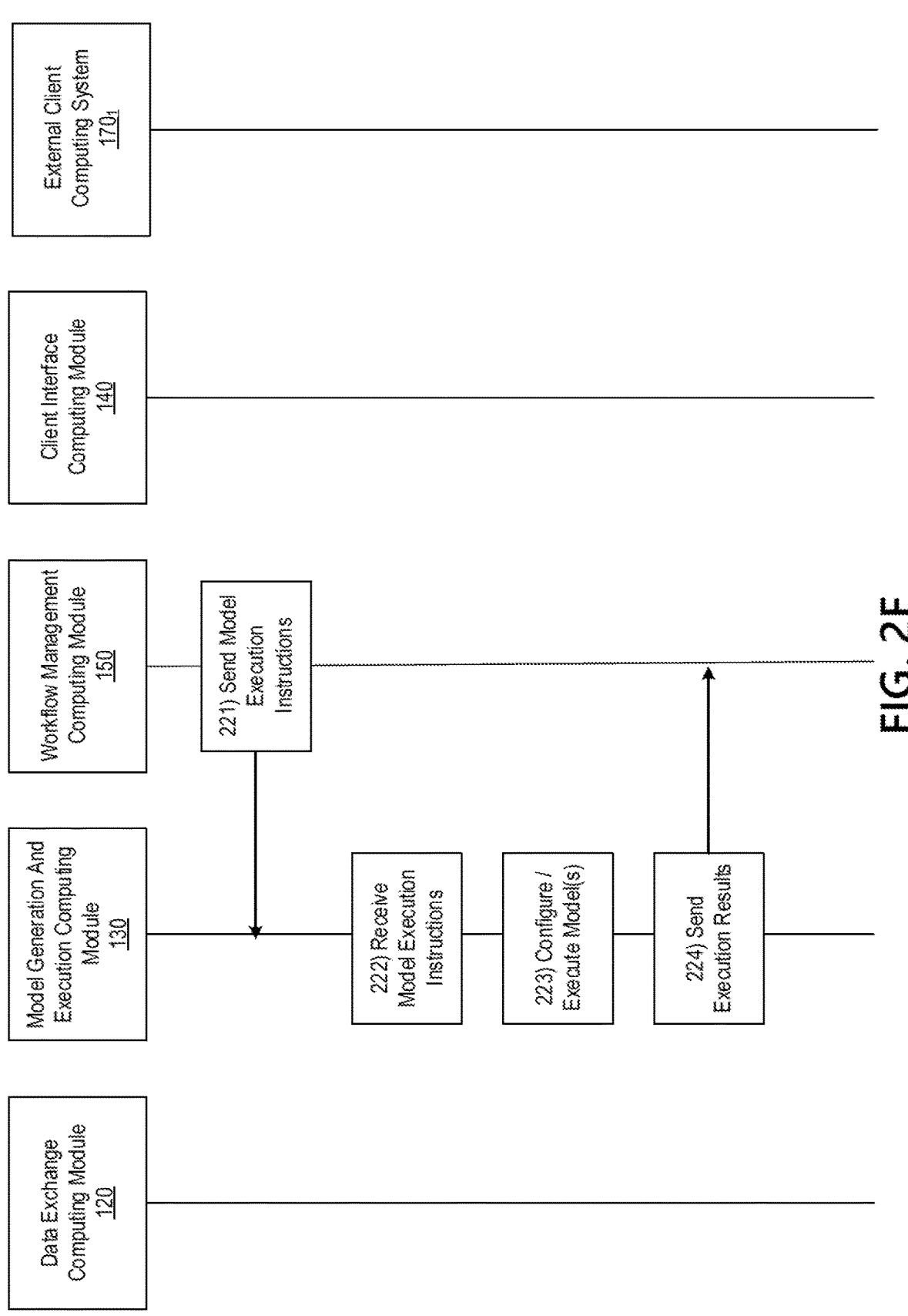

At step 216, workflow management computing engine 150 may send the model execution instructions of the model execution workflow generated at step 215 to model generation and execution computing engine 130. Referring to FIG. 2E, at step 217, model generation and execution computing engine 130 may receive the model execution instructions for the model execution workflow from workflow management computing engine 150. At step 218, model generation and execution computing engine 130 may configure one or more predictive AI models for execution based on the execution instructions. For example, model generation and execution computing engine 130 may extract the input data for each model identified in the execution instructions and send the input data to the corresponding predictive AI model that is to utilize the input data during execution. Model generation and execution computing engine 130 may then execute the one or more predictive AI models using the input data, as specified in the model execution instructions.

At step 219, model generation and execution computing engine 130 may send the execution results to workflow management computing engine 150. The contents of the execution results sent from model generation and execution computing engine 130 to workflow management computing engine 150 may vary based on the model execution instructions received by model generation and execution computing engine 130 from workflow management computing engine 150 at step 217. For example, where only one predictive AI model was to be executed by model generation and execution computing engine 130 or where multiple predictive AI models were to be executed in parallel, the instructions may specify that the output data of the execution(s) should be sent from model generation and execution computing engine 130 to workflow management computing engine 150. In another example, where two predictive AI models are to be executed sequentially, with the output of the execution of the first predictive AI model to be used in part as input to the execution of the second predictive AI model, the instructions may specify that a notification indicating completion of the execution of the first predictive AI model is to be sent from model generation and execution computing engine 130 to workflow management computing engine 150.

At step 220, workflow management computing engine 150 may analyze the execution results and/or the model execution workflow. If analysis of the execution results and/or the model execution workflow indicates that all predictive AI models identified in the model execution workflow have been successfully executed, workflow management computing engine 150 may proceed to step 226. If analysis of the execution results and/or the model execution workflow indicate that additional AI predictive models need to be executed (for example, using the execution results received at step 219), workflow management computing engine 150 may, referring to FIG. 2F, generate and send new model execution instructions to model generation and execution computing engine 130 at step 221. The new model execution instructions generated by workflow management computing engine 150 may identify the next predictive AI model to be executed by model generation and execution computing engine 130 as part of the model execution workflow, as well as any additional input data required for execution of the next predictive AI model (which may have been previously received by workflow management computing engine 150 from client interface computing engine 140 via section 320 of the first graphical user interface 300).

At step 222, model generation and execution computing engine 130 may receive the new model execution instructions from workflow management computing engine 150. At step 223, model generation and execution computing engine 130 may configure one or more predictive AI models for execution based on the new model execution instructions. For example, model generation and execution computing engine 130 may extract the input data for each model identified in the new model execution instructions and send the input data to the corresponding predictive AI model that is to utilize the input data during execution. Model generation and execution computing engine 130 may then execute one or more predictive AI models using the input data, as specified in the new model execution instructions.

At step 224, model generation and execution computing engine 130 may send the model execution results to workflow management computing engine 150. Similar to the discussion above, the contents of the execution results sent from model generation and execution computing engine 130 to workflow management computing engine 150 may vary based on the new model execution instructions received by model generation and execution computing engine 130 from workflow management computing engine 150 at step 222. For example, where only one predictive AI model was to be executed by model generation and execution computing engine 130 or where multiple predictive AI models were to be executed in parallel, the instructions may specify that the output data of the execution(s) should be sent from model generation and execution computing engine 130 to workflow management computing engine 150. In another example, where two predictive AI models were to be executed sequentially, with the output of the execution of the first predictive AI model to be used in part as input to the execution of the second predictive AI model, the instructions may specify that a notification indicating completion of the execution of the first predictive AI model is to be sent from model generation and execution computing engine 130 to workflow management computing engine 150.

Figure 2G:
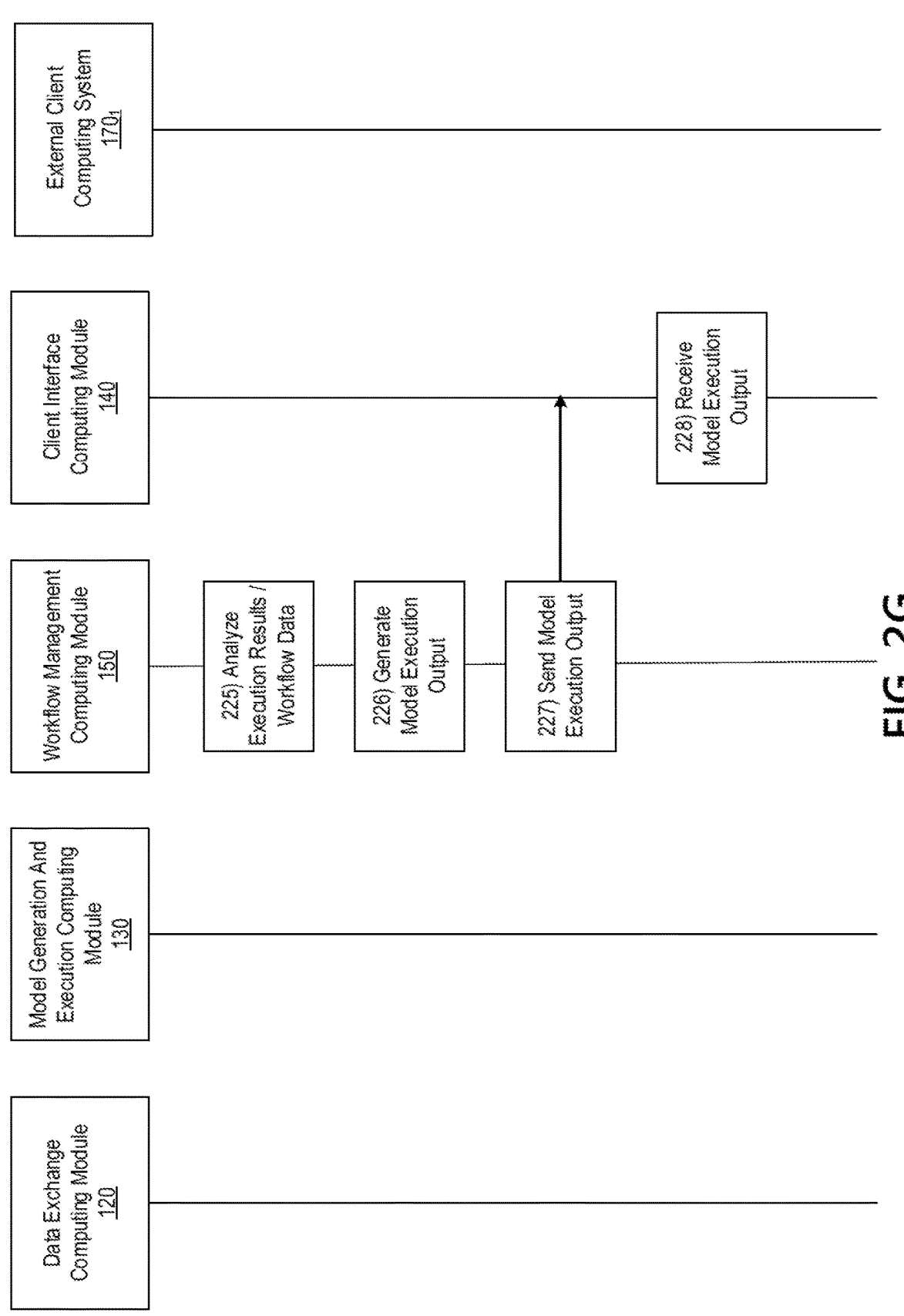

Referring to FIG. 2G, at step 225, workflow management computing engine 150 may analyze the model execution results and/or the model execution workflow. If analysis of the model execution results and/or the model execution workflow indicates that all predictive AI models identified in the model execution workflow have been successfully executed, workflow management computing engine 150 may proceed to step 226. At step 226, workflow management computing engine 150 may generate a model execution output. The specific contents of the model execution output generated by workflow management computing engine 150 at step 226 may vary based on the contents of the model execution request initially received by workflow management computing engine 150 from client interface computing engine 140. For example, if the model execution request identified a single predictive AI model to be executed by model generation and execution computing engine 130 of predictive AI model generation and execution system 110, the model execution output may contain the execution output data generated as a result of the singular execution.

In another example, if the model execution request indicated a plurality of predictive AI models to be executed in parallel by model generation and execution computing engine 130 of predictive AI model generation and execution system 110, the model execution output may contain the execution output data of each predictive AI model executed by predictive AI model generation and execution system 110. In yet another example, if the model execution request indicated a plurality of AI models to be executed sequentially by model generation and execution computing engine 130 of predictive AI model generation and execution system 110, the model execution output may contain the execution output data of only the final predictive AI model executed by model generation and execution computing engine 130 of predictive AI model generation and execution system 110 or may contain the execution output data of each predictive AI model executed by model generation and execution computing engine 130 of predictive AI model generation and execution system 110.

Figure 2H:
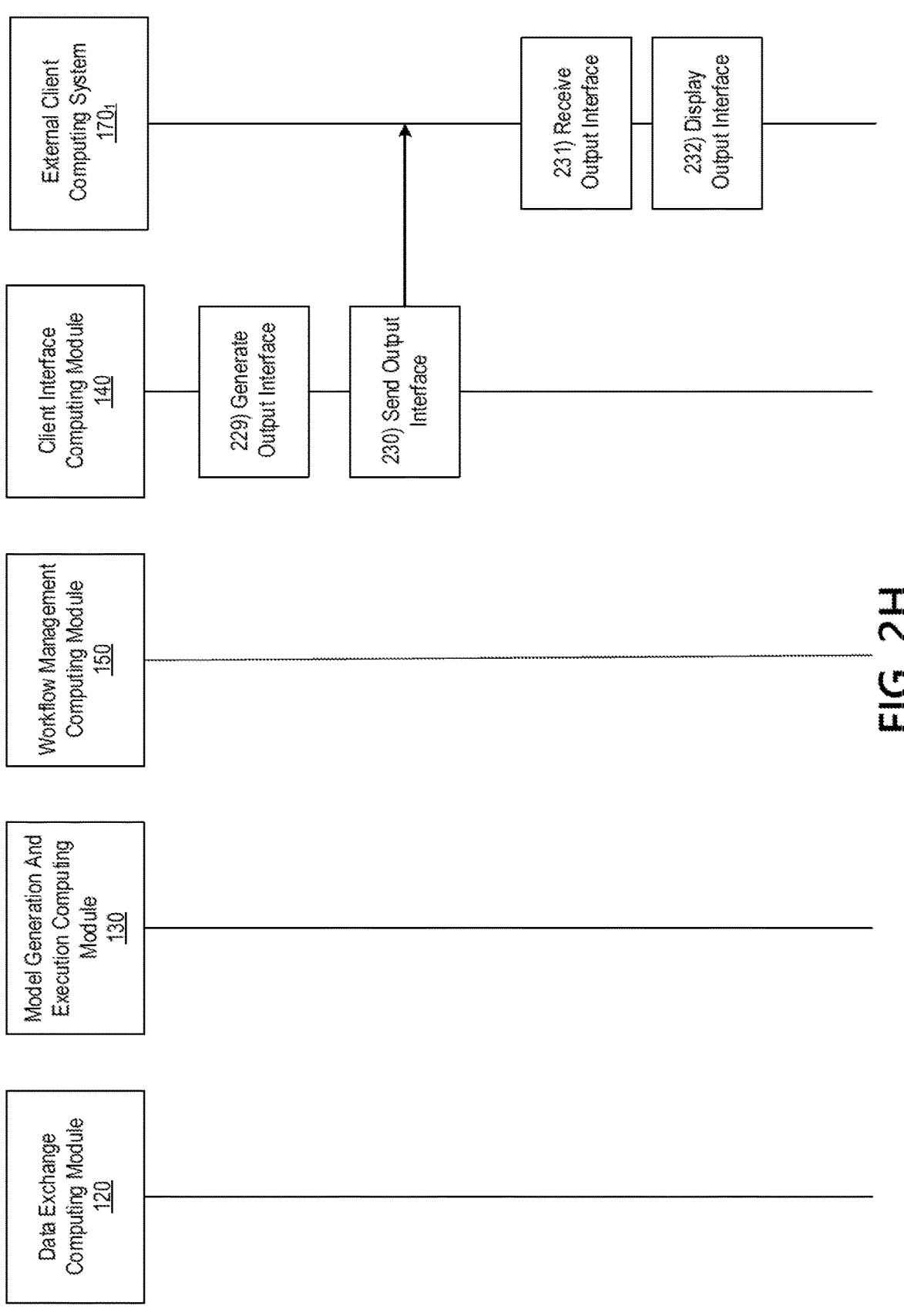
Figure 21:
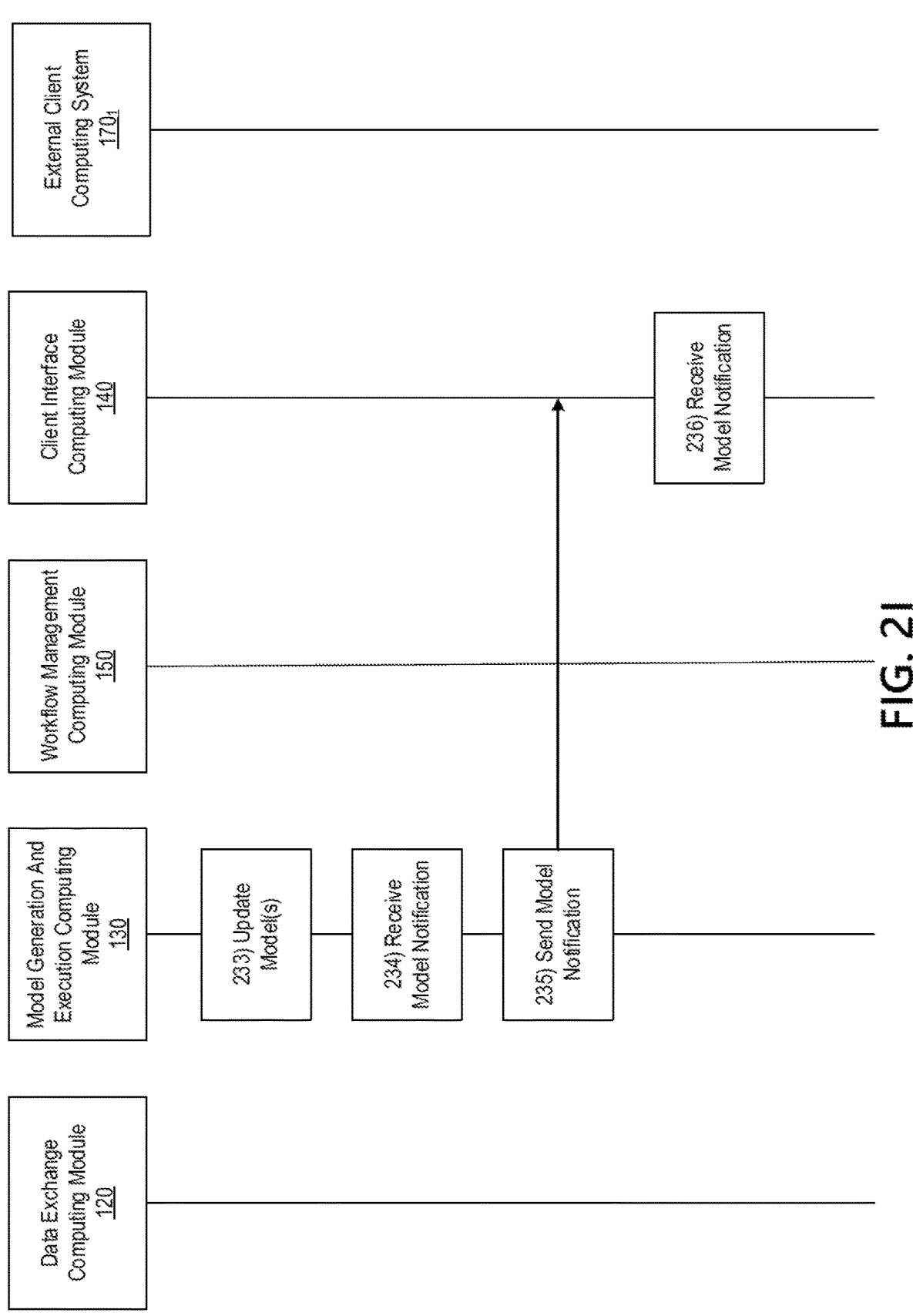
Figure 3B:
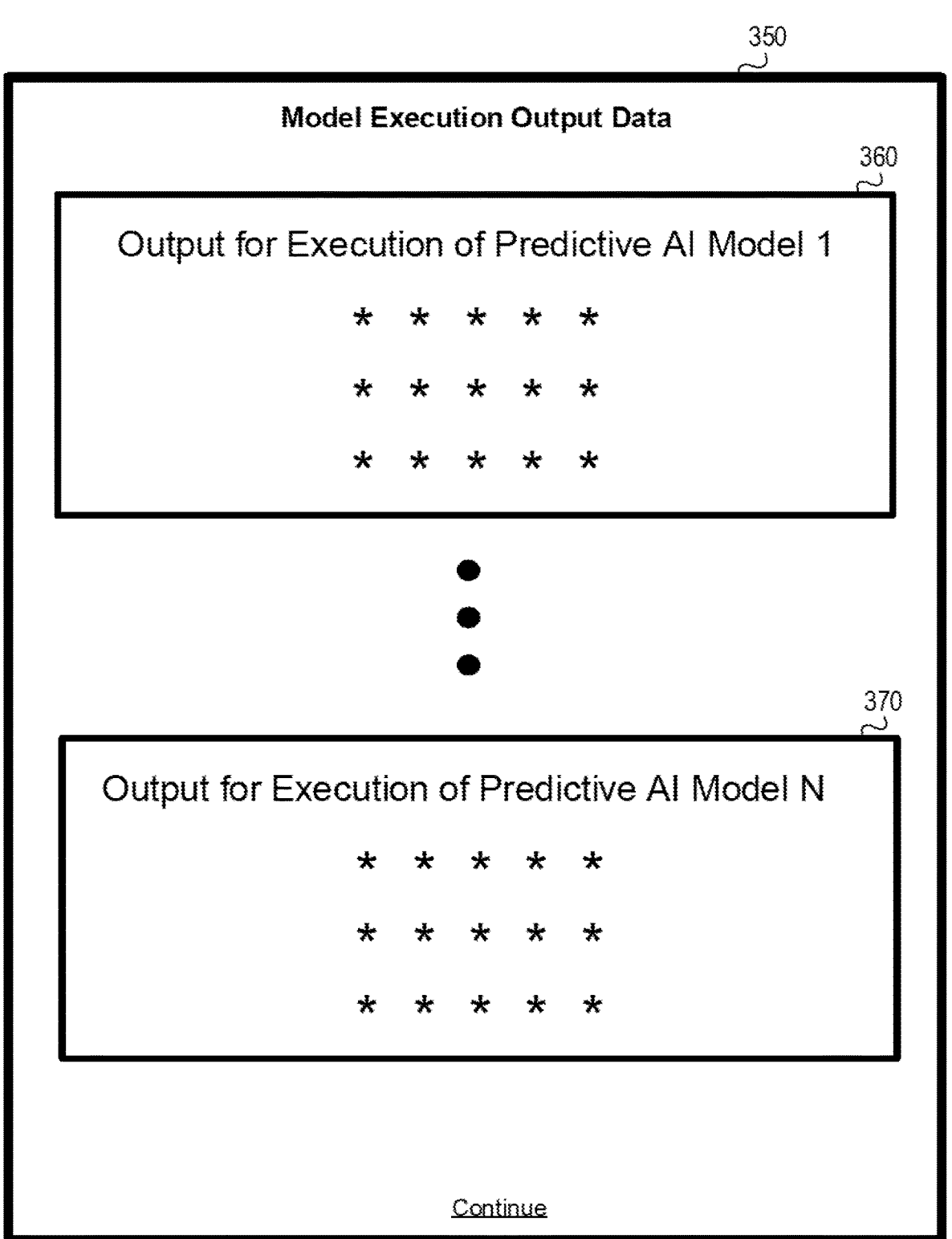

At step 227, workflow management computing engine 150 may send the model execution output data to client interface computing engine 140. At step 228, client interface computing engine 140 may receive the model execution output data from workflow management computing engine 150. Referring to FIG. 2H, in response to receiving the model execution output data at step 228, client interface computing engine 140 may, at step 229, generate a second graphical user interface. An illustrative second graphical user interface 350 that may be generated by client interface computing engine 140 at step 228 is shown in FIG. 3B. Referring to FIG. 3B, second graphical user interface 350 includes sections 360 and sections 370. Each section (such as sections 360 and 370 of second graphical user interface 350) may display execution output data from the execution of a different predictive AI model that was initially identified in the model execution request. In one example, the execution output data may be targeted products and/or services for a given user or set of users.

Referring back to FIG. 2H, client interface computing engine 140 may, at step 230, send second graphical user interface 350 to external client computing system 170₁. At step 231, external client computing system 170₁ may receive the second graphical user interface 350 from client interface computing engine 140. One or more of sending the second graphical user interface 350 by client interface computing engine 140 or receiving the second graphical user interface 350 by external client computing system 170₁ may be configured to result in external client computing system 170₁ outputting, at step 232, the second graphical user interface 350 to a display device of external client computing system 170₁, thus allowing the user that initially configured the model execution request to view the results of the execution of that model execution request.

Referring to FIG. 2I, model generation and execution computing engine 130 may update one or more predictive AI models based on the model execution results that was generated during execution of the predictive AI models specified in the model execution request at step 233. Model generation and execution computing engine 130 may re-train each of the predictive AI models that was executed using the model execution results generated as a result of that execution, or may re-train a subset of the predictive AI models that were executed using the model execution results generated as a result of that execution. Additionally, or alternatively, model generation and execution computing engine 130 may update one or more predictive AI models that was not identified in the model execution request using the model execution results that was generated as a result of executing the one or more predictive AI models specified in the model execution request.

In one example, and as illustrated by execution of steps 217-226, execution of the predictive AI models of model generation and execution computing engine 130 may be triggered via a user request for execution. In another example, execution of one or more predictive AI models of model generation and execution computing engine 130 may be continuously occurring, without any specific user request. For example, the enterprise organization associated with predictive AI model generation and execution system 110 may configure model generation and execution computing engine 130 to continuously input processed data as it is received from data exchange computing engine 120 into one or more particular predictive AI models. The enterprise organization may specify the particular processed data and/ or the one or more particular predictive AI models. Thus, model generation and execution computing engine 130 may simultaneously execute a plurality of predictive AI models-a subset of these executions may be intermittent and dependent on the incoming model execution instructions from workflow management computing engine 150, while another subset of these executions may be continuous and dependent on the processed data incoming from data exchange computing engine 120.

As a result of this continuous execution of particular predictive AI models, model generation and execution computing engine 130 may receive, at step 234, model notifications from these predictive AI models on a continuous or periodic basis. Model generation and execution computing engine 130 may receive these model notifications from a predictive AI model running continuously in the background as a result of that predictive AI model generating new model execution results (such as targeted offers and/or services for a user or set of users). As a result of receiving a model notification from a predictive AI model, model generation and execution computing engine 130 may send the model notification received from the predictive AI model to client interface computing engine 140 at step 235. At step 236, client interface computing engine 140 may receive the model notification from model generation and execution computing engine 130.

Figure 2J:
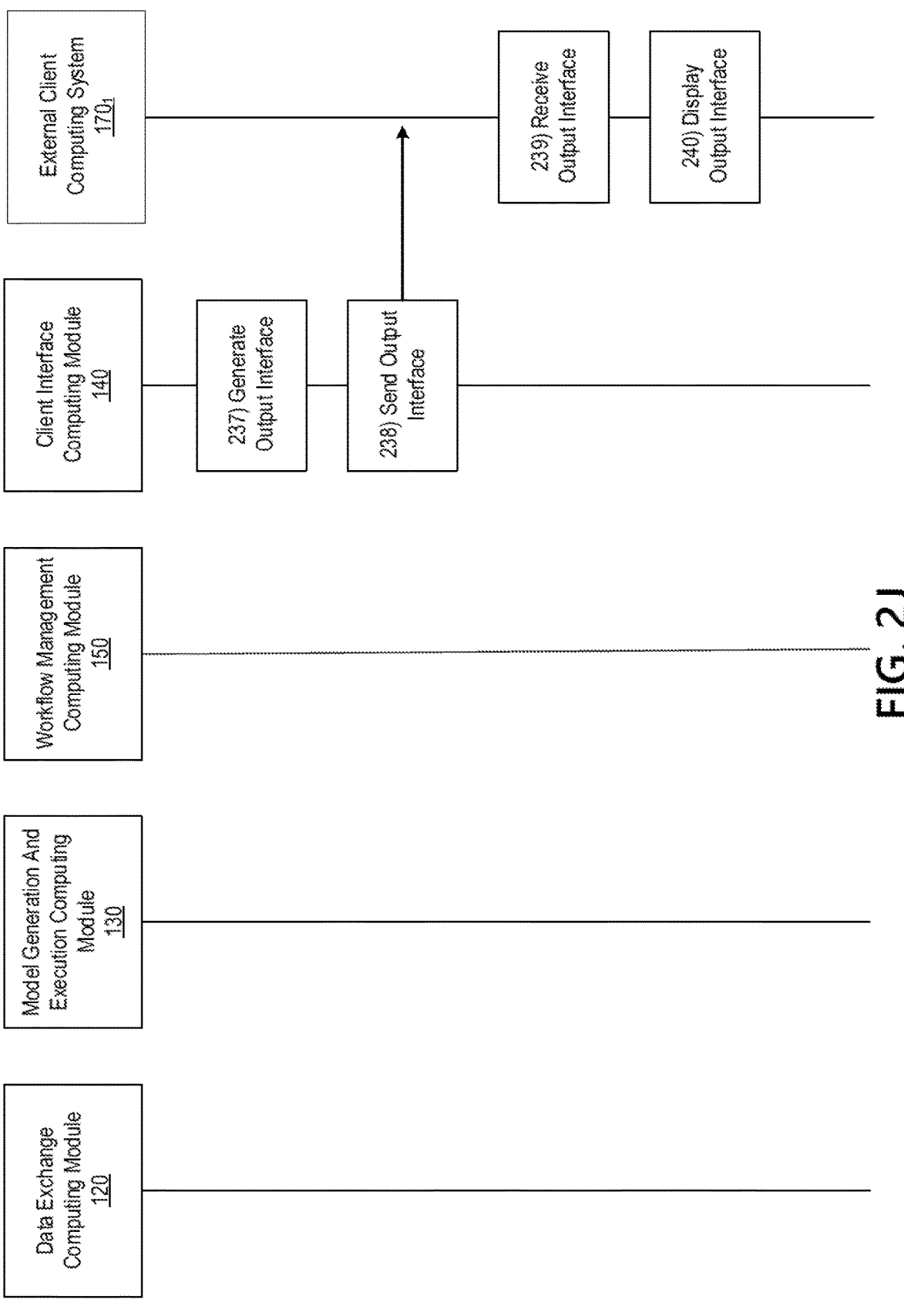

Referring to FIG. 2J, at step 237, in response to receiving the model notification from model generation and execution computing engine 130, client interface computing engine 140 may generate a third graphical user interface. The model notification may include data identifying one or more users, one or more historical events related to the one or more users, and one or more offers for the one or more users. As discussed above, the predictive AI models may be used by an enterprise organization to identify targeted products or services that may be of interest to the user based on recent activities of a user. For example, for a user that has recently expressed interest in purchasing a house, an enterprise organization may provide targeted financial products and/or services, such as mortgage loan offers, home appliance loans, and/or the like. Thus, the third graphical user interface generated by client interface computing engine 140 in response to receiving the model notification may be a listing of the targeted products and/or services that the enterprise organization associated with predictive AI model generation and execution system 110 is offering to the user identified in the model notification. The listing may be provided in a selectable format, thus allowing the user to interact with the output interface to select the products and/or services that the user is interested in.

At step 238, client interface computing engine 140 may send the third graphical user interface to external client computing system $170_1$. External client computing system $170_1$ may be any computing system associated with the user identified in the model notification, such as a computer, mobile device, and/or the like. At step 239, external client computing system $170_1$ may receive the third graphical user interface from client interface computing engine 140. The sending of the third graphical user interface by client interface computing engine 140 and/or the receiving of the third graphical user interface by external client computing system $170_1$ may be configured to cause external client computing system $170_1$ to output the third graphical user interface for display to a display device associated with external client computing system $170_1$ at step 240.

Figure 2K:
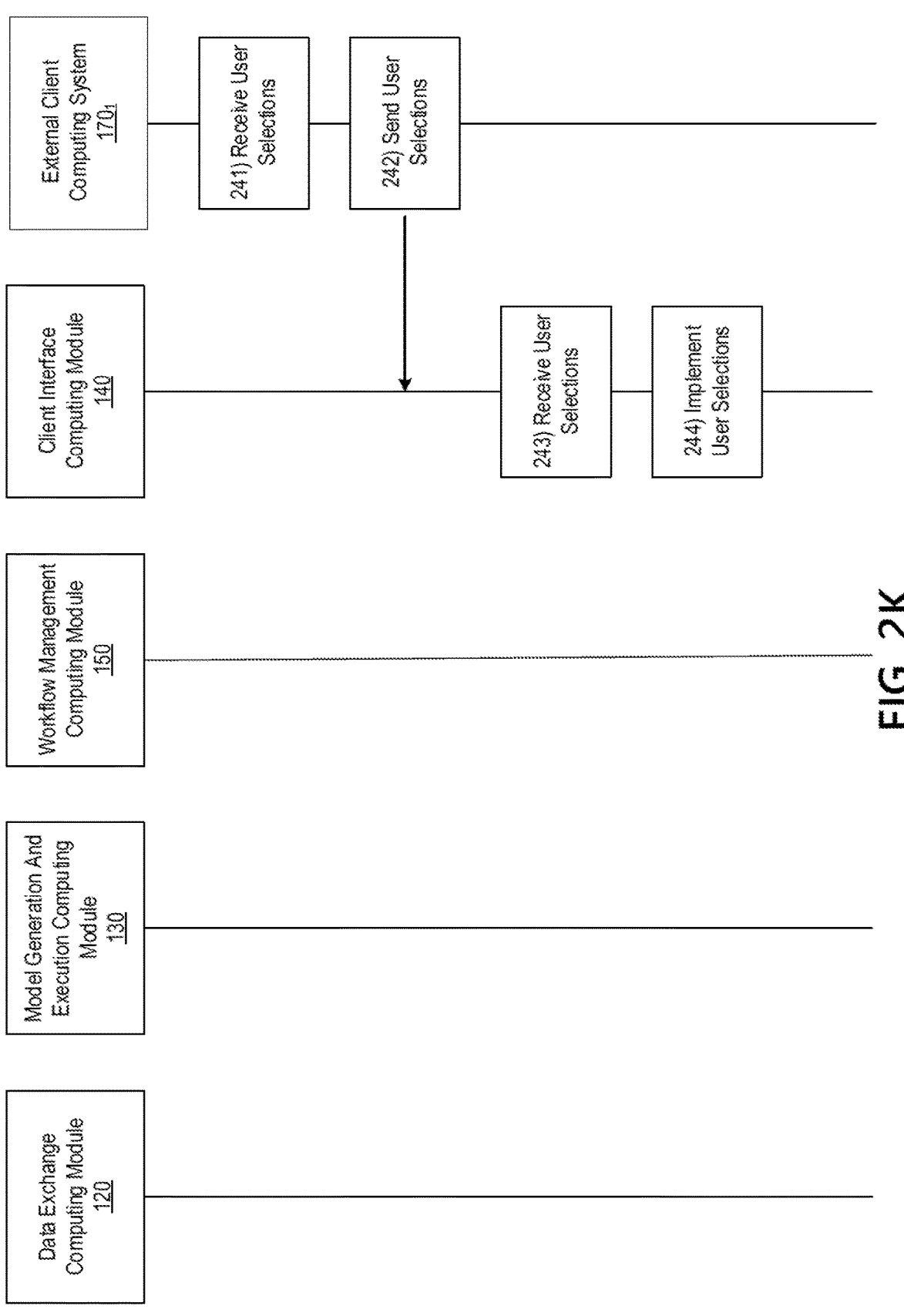

With reference to FIG. 2K, at step 241, external client computing system $170_1$ may receive, via the third graphical user interface, one or more user selections identifying one or more products and/or services that the user is interested in. In response to receiving the user selections, external client computing system $170_1$ may, at step 242, send the one or more user selections to client interface computing engine 140. At step 243, client interface computing engine 140 may receive the one or more user selections from external client computing system $170_1$. In response to receiving the one or more user selections, client interface computing engine 140 may implement the user selections at step 244. For example, client interface computing engine 140 may implement the user selections by sending the user additional information related to the selected products and/or services. The additional information may include a selectable hyperlink, which, when selected by the user, takes the user to a webpage allowing the user to purchase the product and/or service. In another example, client interface computing engine 140 may implement the user selections by sending a notification comprising the one or more user selections to another computing system associated with the enterprise organization, which may in turn provide the user with additional information regarding the user selected products and/or services. In one instance, implementing the user selections may include additional actions, such as logging any user purchases of the offered products and/or services in a blockchain.

Figure 4B:
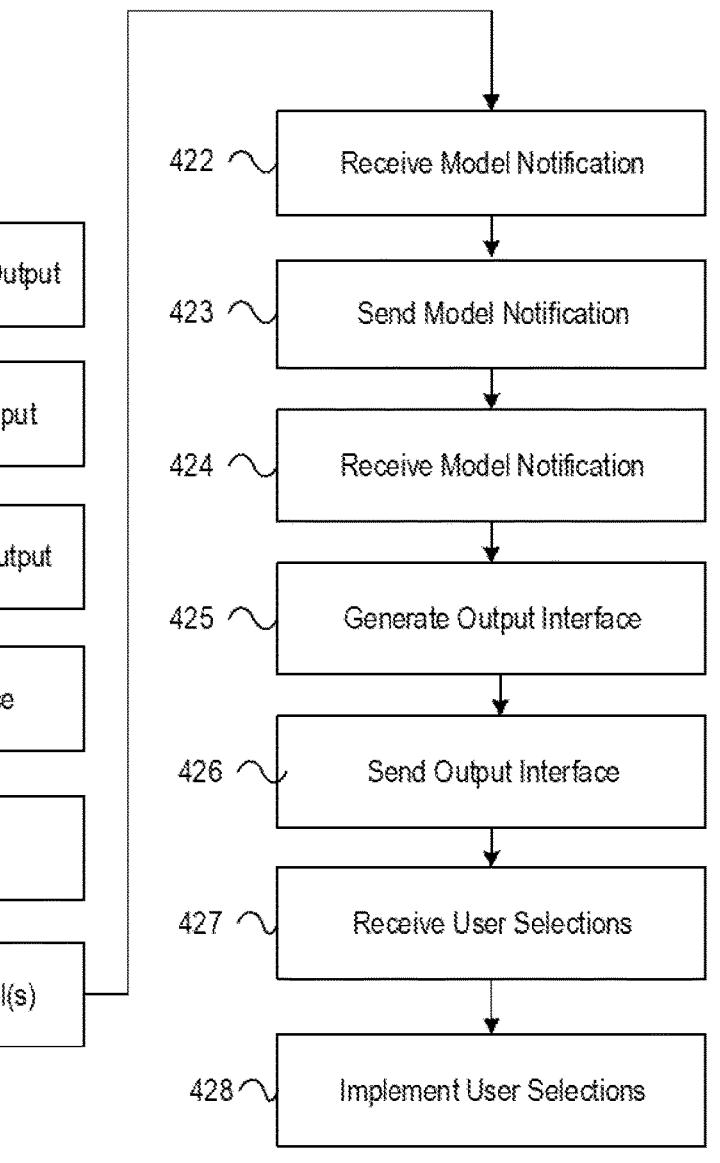

FIGS. 4A and 4B depict an illustrative method for implementing a predictive AI model generation and execution system that utilizes one or more predictive AI models. Referring to FIG. 4A, at step 401, a data exchange computing engine of a predictive AI model generation and execution system, the data exchange computing engine having at least one processor, a communication interface, and memory, may receive one or more data streams from one or more data sources. At step 402, the data exchange computing engine may generate processed data from the one or more data streams. At step 403, the data exchange computing engine may send the processed data to a model generation and execution computing engine of the predictive AI model generation and execution system. At step 404, the model generation and execution computing engine, having at least one processor, a communication interface, and memory, may receive the processed data. At step 405, the model generation and execution computing engine may update and/or generate one or more predictive AI models based on the processed data. At step 406, a client interface computing engine of the predictive AI model generation and execution system, the client interface computing engine having at least one processor, a communication interface, and memory, may receive a model execution request from an external client computing system. At step 407, the client interface computing engine may generate a first graphical user interface.

At step 408, the client interface computing engine may send the first graphical user interface to the external client computing system. At step 409, the client interface computing engine may receive model execution data from the external client computing system. At step 410, a workflow management computing engine of the predictive AI model generation and execution system, the workflow management computing engine having at least one processor, a communication interface, and memory, may generate a model execution workflow comprising model execution instructions based on the model execution data. At step 411, the workflow management computing engine may send one or more model execution instructions to the model generation and execution computing engine. At step 412, the model generation and execution computing engine may configure and execute one or more predictive AI models based on the model execution instructions.

At step 413, the model generation and execution computing engine may send model execution results to the workflow management computing engine. At step 414, the workflow management computing engine may analyze the model execution results and/or the model execution workflow. At step 415, the workflow management computing engine may determine, based on the model execution workflow, whether additional predictive AI models are to be executed. If the workflow management computing engine determines at step 415 that additional predictive AI models are to be execute, the processing may return to step 411, where the workflow management computing engine may generate new model execution instructions that are sent to the model generation and execution computing engine. If the workflow management computing engine determines at step 415 that no additional predictive AI models are to be executed, processing may proceed to step 416 in FIG. 4B, where the workflow management computing engine may generate a model execution output. At step 417, the workflow management computing engine may send the model execution output to the client interface computing engine. At step 418 the client interface computing engine may receive the model execution output from the workflow management computing engine.

At step 419, the client interface computing engine may generate an output interface (e.g., the second graphical user interface). At step 420, the client interface computing engine may send the output interface to the external client computing system. At step 421, the model generation and execution computing engine may update one or more predictive AI models based on the model execution results. At step 422, the model generation and execution computing engine may receive a model notification from a predictive AI model. At step 423, the model generation and execution computing engine may send the model notification to the client interface computing engine. At step 424, the client interface computing engine may receive the model notification from the model generation and execution computing engine. At step 425, the client interface computing engine may generate an output interface (e.g., the third graphical user interface) based on the model notification. At step 426, the client interface computing engine may send the output interface to an external client computing system. At step 427, the client interface computing engine may receive one or more user elections from the external client computing system. At step 428, the client interface computing engine may implement the one or more user selections.

One or more aspects of the disclosure may be embodied in computer-usable data or computer-executable instructions, such as in one or more program engines, executed by one or more computers or other devices to perform the operations described herein. Generally, program engines include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program engines may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An artificial intelligence (AI) predictive model generation and execution system comprising:

a data exchange computing engine comprising:

a first processor;

a first communication interface communicatively coupled to the first processor; and first memory storing computer-readable instructions that, when executed by the first processor, causes the data exchange computing engine to:

receive a plurality of data streams;

process, in-real time, the plurality of data streams to generate processed data, wherein processing the plurality of data streams to generate processed data includes anonymizing the plurality of data streams by tagging data in each data stream of the plurality of data stream with anonymous usernames, pseudonyms and identification numbers; and send, to a model generation and execution computing engine, the processed data; and the model generation and execution computing engine, wherein the model generation and execution computing engine comprises:

a second processor;

a second communication interface communicatively coupled to the first processor; and second memory storing computer-readable instructions that, when executed by the second processor, causes the model generation and execution computing engine to:

receive the processed data from the data exchange computing engine;

identify a first predictive artificial intelligence model for updating based on at least one tagged anonymous username, pseudonym or identification number in the processed data; and update the first predictive artificial intelligence model using the processed data;

a client interface computing engine comprising:

a third processor;

a third communication interface communicatively coupled to the third processor; and third memory storing computer-readable instructions that, when executed by the third processor, causes the client interface computing engine to:

receive a model execution request;

generate, in response to receiving the model execution request, a first graphical user interface, the first graphical user interface comprising a section for selecting one or more predictive AI models to be executed by the model generation and execution computing engine, wherein the one or more predictive AI models are trained predictive AI models that have been trained using the processed data;

send the first graphical user interface to an external client computing system, wherein sending the first graphical user interface to the external client computing system causes the external client computing system to output the first graphical user interface to a display device;

receive, from the external client computing system, model execution data; and send, to a workflow management computing engine of the predictive AI model generation and execution system, the model execution data; and the workflow management computing engine, wherein the workflow management computing engine comprises:

a fourth processor;

a fourth communication interface communicatively coupled to the fourth processor; and fourth memory storing computer-readable instructions that, when executed by the fourth processor, causes the workflow management computing engine to:

generate, based on the model execution data, one or more model execution instructions; and send, to the model generation and execution computing engine, the one or more model execution instructions.

2. The predictive AI model generation and execution system of claim 1, wherein a first data stream of the plurality of data streams is received continuously.

3. The predictive AI model generation and execution system of claim 2, wherein a second data stream of the plurality of data streams is received periodically.

4. The predictive AI model generation and execution system of claim 1, wherein processing the plurality of data streams comprises removing redundant data.

5. The predictive AI model generation and execution system of claim 1, the second memory storing computer-readable instructions that, when executed by the second processor, causes the model generation and execution computing engine to:

receive the one or more model execution instructions; and execute, based on the one or more model execution instructions, one or more predictive artificial intelligence models.

6. The predictive AI model generation and execution system of claim 5, wherein:

the one or more predictive artificial intelligence models comprise a plurality of predictive artificial intelligence models that are executed in parallel.

7. The predictive AI model generation and execution system of claim 5, wherein:

the one or more predictive artificial intelligence models comprise a plurality of predictive artificial intelligence models that are executed sequentially.

8. The predictive AI model generation and execution system of claim 7, wherein output data generated from executing a first predictive artificial intelligence model is used as input data for executing a second predictive artificial intelligence model.

9. The predictive AI model generation and execution system of claim 8, wherein the output data is sent from the model generation and execution computing engine to the workflow management computing engine.

10. A method comprising:

at a data exchange computing engine comprising a first processor, a first communication interface communicatively coupled to the first processor, and first memory:

receiving a plurality of data streams;

processing, in-real time, the plurality of data streams to generate processed data, wherein processing the plurality of data streams to generate processed data includes anonymizing the plurality of data streams by tagging data in each data stream of the plurality of data stream with anonymous usernames, pseudonyms and identification numbers; and sending, to a model generation and execution computing engine, the processed data; and at the model generation and execution computing engine comprising a second processor, a second communication interface communicatively coupled to the first processor, and second memory:

receiving the processed data from the data exchange computing engine;

identifying a first predictive artificial intelligence model for updating based on at least one tagged anonymous username, pseudonym or identification number in the processed data; and updating the first predictive artificial intelligence model using the processed data;

at a client interface computing engine comprising a third processor, a third communication interface communicatively coupled to the third processor, and third memory:

receiving a model execution request;

generating, in response to receiving the model execution request, a first graphical user interface, the first graphical user interface comprising a section for selecting one or more predictive AI models to be executed by the model generation and execution computing engine, wherein the one or more predictive AI models are trained predictive AI models that have been trained using the processed data;

sending the first graphical user interface to an external client computing system, wherein sending the first graphical user interface to the external client computing system causes the external client computing system to output the first graphical user interface to a display device;

receiving, from the external client computing system, model execution data; and sending, to a workflow management computing engine, the model execution data; and at the workflow management computing engine comprising a fourth processor, a fourth communication interface communicatively coupled to the fourth processor, and fourth memory:

generating, based on the model execution data, one or more model execution instructions; and sending, to the model generation and execution computing engine, the one or more model execution instructions.

11. The method of claim 10, wherein a first data stream of the plurality of data streams is received continuously.

12. The method of claim 11, wherein a second data stream of the plurality of data streams is received periodically.

13. The method of claim 10, wherein processing the plurality of data streams comprises removing redundant data.

14. The method of claim 10, further comprising at the model generation and execution computing engine:

receiving the one or more model execution instructions; and executing, based on the one or more model execution instructions, one or more predictive artificial intelligence models.

15. The method of claim 14, wherein:

the one or more predictive artificial intelligence models comprise a plurality of predictive artificial intelligence models that are executed in parallel.

16. The method of claim 14, wherein:

the one or more predictive artificial intelligence models comprise a plurality of predictive artificial intelligence models that are executed sequentially.

17. The method of claim 16, wherein output data generated from executing a first predictive artificial intelligence model is used as input data for executing a second predictive artificial intelligence model.

18. A plurality of non-transitory computer-readable media comprising:

first non-transitory computer-readable media storing instructions that, when executed by a data exchange computing engine comprising a first processor, a first communication interface communicatively coupled to the first processor, and first memory, cause the data exchange computing engine to:

receive a plurality of data streams;

process, in-real time, the plurality of data streams to generate processed data, wherein processing the plurality of data streams to generate processed data includes anonymizing the plurality of data streams by tagging data in each data stream of the plurality of data stream with anonymous usernames, pseudonyms and identification numbers; and send, to a model generation and execution computing engine, the processed data;

second non-transitory computer-readable media storing instructions that, when executed by the model generation and execution computing engine comprising a second processor, a second communication interface, and a second memory, cause the model generation and execution computing engine to:

receive the processed data from the data exchange computing engine;

identify a first predictive artificial intelligence model for updating based on at least one tagged anonymous username, pseudonym or identification number in the processed data; and update the first predictive artificial intelligence model using the processed data;

third non-transitory computer-readable media storing instructions that, when executed by a client interface computing engine comprising a third processor, a third communication interface communicatively coupled to the third processor, and third memory, cause the client interface computing engine to:

receive a model execution request;

generate, in response to receiving the model execution request, a first graphical user interface, the first graphical user interface comprising a section for selecting one or more predictive AI models to be executed by the model generation and execution computing engine, wherein the one or more predictive AI models are trained predictive AI models that have been trained using the processed data;

send the first graphical user interface to an external client computing system, wherein sending the first graphical user interface to the external client computing system causes the external client computing system to output the first graphical user interface to a display device;

receive, from the external client computing system, model execution data; and send, to a workflow management computing engine, the model execution data;

fourth non-transitory computer-readable media storing instructions that, when executed by the workflow management computing engine comprising a fourth processor, a fourth communication interface communicatively coupled to the fourth processor, and fourth memory, cause the workflow management computing engine to:

generate, based on the model execution data, one or more model execution instructions; and send, to the model generation and execution computing engine, the one or more model execution instructions.

* * * * *